(12) United States Patent
Pernici et al.

(10) Patent No.: US 9,688,207 B1
(45) Date of Patent: Jun. 27, 2017

(54) UNIVERSALLY POSITIONAL ARTICLE MOUNTING ASSEMBLIES AND METHODS

(71) Applicants: Thomas P. Pernici, Shreveport, LA (US); T. Scott Pernici, Shreveport, LA (US)

(72) Inventors: Thomas P. Pernici, Shreveport, LA (US); T. Scott Pernici, Shreveport, LA (US)

(*) Notice: Subject to any disclaimer, the term of this patent is extended or adjusted under 35 U.S.C. 154(b) by 0 days.

(21) Appl. No.: 14/722,280

(22) Filed: May 27, 2015

Related U.S. Application Data

(63) Continuation-in-part of application No. 14/591,443, filed on Jan. 7, 2015.

(51) Int. Cl.
- *B60R 7/04* (2006.01)
- *B60R 11/02* (2006.01)
- *F16M 13/02* (2006.01)

(52) U.S. Cl.
CPC .............. *B60R 7/04* (2013.01); *B60R 11/02* (2013.01); *B60R 11/0235* (2013.01); *F16M 13/02* (2013.01)

(58) Field of Classification Search
CPC . B60R 11/02; B60R 11/0235; B60R 11/0252; B60R 11/0258; B60R 2011/0042; F16M 13/02; F16M 13/00; G09F 19/02
USPC .......................... 248/309.1, 316.2, 314, 310
See application file for complete search history.

(56) References Cited

U.S. PATENT DOCUMENTS

| | | | |
|---|---|---|---|
| 1,915,958 A | 6/1933 | Skirrow | |
| 4,735,388 A * | 4/1988 | Marks | A61J 9/06 248/103 |
| 5,002,327 A | 3/1991 | Bickford | |
| 5,187,744 A * | 2/1993 | Richter | B60R 11/0241 224/553 |
| 5,489,055 A * | 2/1996 | Levy | B60N 3/103 224/544 |
| 5,573,215 A * | 11/1996 | Jen | G01N 3/04 24/115 M |
| 5,576,687 A * | 11/1996 | Blank | B60K 35/00 340/438 |
| 5,593,124 A * | 1/1997 | Wang | B60R 11/00 224/483 |
| 5,641,191 A * | 6/1997 | Jia | B60J 3/02 16/224 |
| 5,890,985 A * | 4/1999 | Jenney | A63B 69/0071 473/447 |
| 5,979,724 A * | 11/1999 | Loewenthal, Jr. | B60R 11/0241 224/483 |
| 6,029,384 A | 2/2000 | McLaughlin | |

(Continued)

*Primary Examiner* — Nkeisha Smith
(74) *Attorney, Agent, or Firm* — R. Keith Harrison

(57) ABSTRACT

Universally positional article mounting assemblies in some embodiments include a mounting tab having a generally flat or planar tab panel including an article mount edge; a tab insert end opposite the article mount edge; a pair of tab side edges extending from the article mount edge to the tab insert end; a first panel surface; and a second panel surface; a substantially universally manipulatable article stem carried by the article mount edge of the tab panel, the article stem having an elongated article stem axis; and at least one article carried by the article stem, the at least one article disposed within an article plane and the article plane normally generally perpendicular to the article stem axis of the article stem.

1 Claim, 18 Drawing Sheets

(56) References Cited

U.S. PATENT DOCUMENTS

| | | | | |
|---|---|---|---|---|
| 6,065,656 A * | 5/2000 | Elshof | | B60N 3/103 |
| | | | | 220/629 |
| 6,125,566 A | 10/2000 | McLaughlin | | |
| 6,158,793 A * | 12/2000 | Castro | | B60R 11/02 |
| | | | | 224/548 |
| 6,435,186 B1 * | 8/2002 | Klemm | | A61B 19/28 |
| | | | | 128/845 |
| 6,560,983 B1 * | 5/2003 | Schimmeyer | | B60N 3/104 |
| | | | | 248/311.2 |
| 6,585,201 B1 * | 7/2003 | Reed | | B60R 11/0235 |
| | | | | 248/181.1 |
| 7,062,300 B1 * | 6/2006 | Kim | | B60R 11/0241 |
| | | | | 379/454 |
| 7,905,456 B2 * | 3/2011 | Gough | | B60R 11/02 |
| | | | | 248/160 |
| 8,505,795 B2 * | 8/2013 | Dunn | | B60R 11/00 |
| | | | | 224/545 |
| 8,573,455 B1 * | 11/2013 | Brown | | B60R 11/0247 |
| | | | | 224/483 |
| 8,746,650 B2 | 6/2014 | Curatolo et al. | | |
| 9,132,779 B2 * | 9/2015 | Azadi | | B60R 11/04 |
| 2004/0040994 A1 * | 3/2004 | Parcelles | | B60N 3/08 |
| | | | | 224/483 |
| 2008/0252089 A1 * | 10/2008 | Hecht | | B60R 11/0235 |
| | | | | 296/1.07 |
| 2012/0049030 A1 * | 3/2012 | Tussy | | B60N 3/103 |
| | | | | 248/311.2 |
| 2014/0138418 A1 | 5/2014 | Dunn | | |
| 2015/0283950 A1 * | 10/2015 | Backman | | B60R 7/06 |
| | | | | 224/483 |
| 2015/0329062 A1 * | 11/2015 | Ackeret | | B60R 11/02 |
| | | | | 248/220.22 |

* cited by examiner

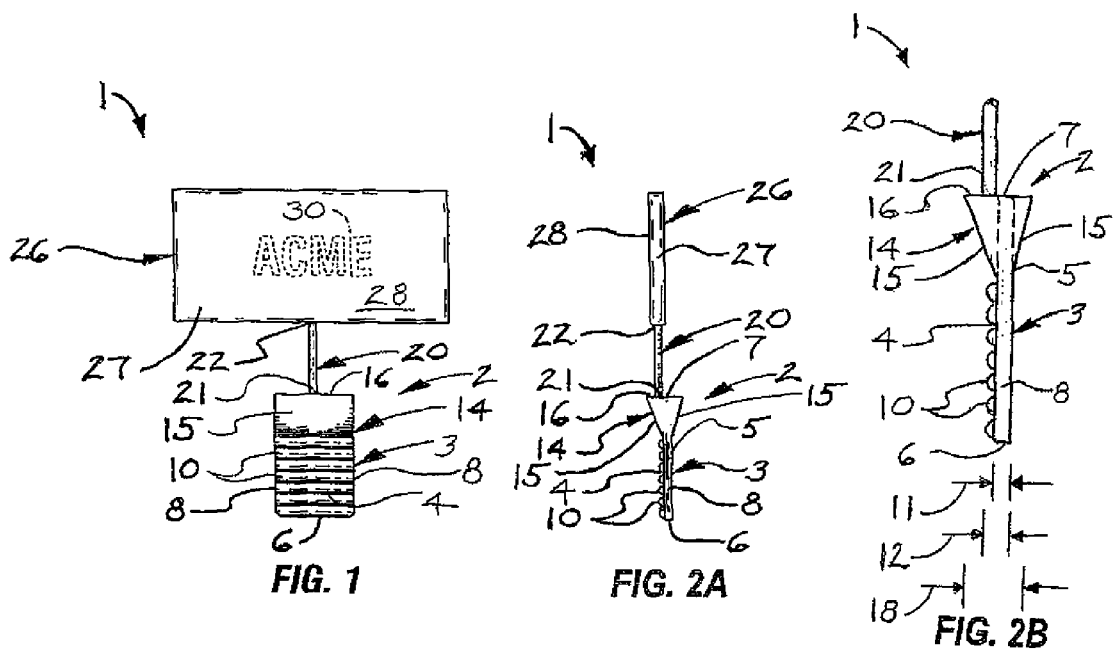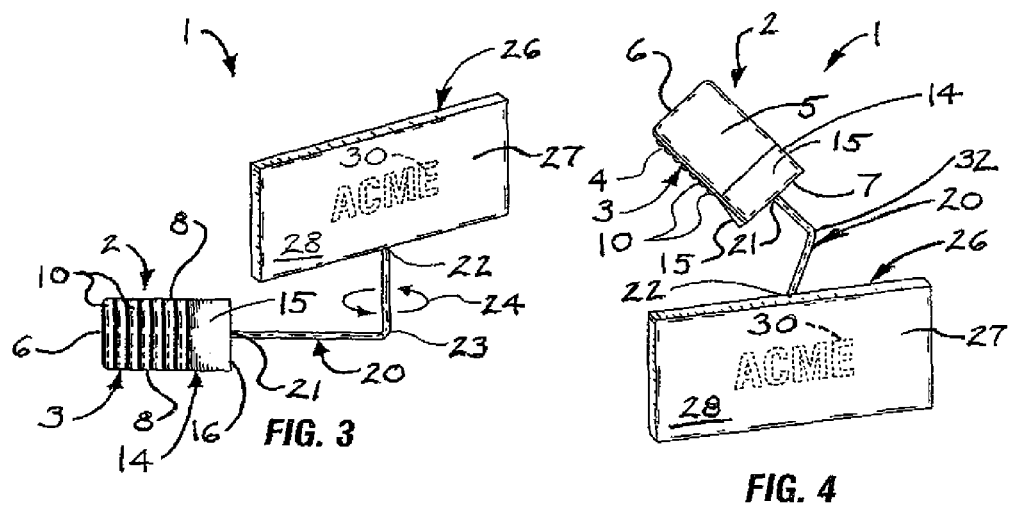

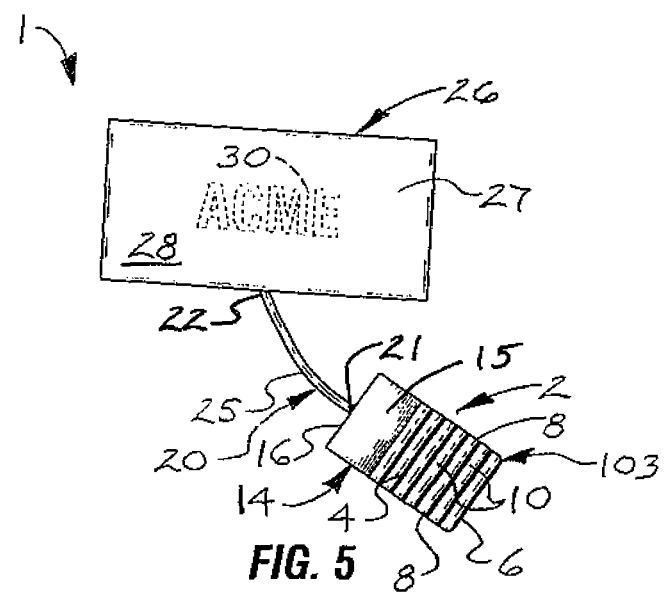
FIG. 5
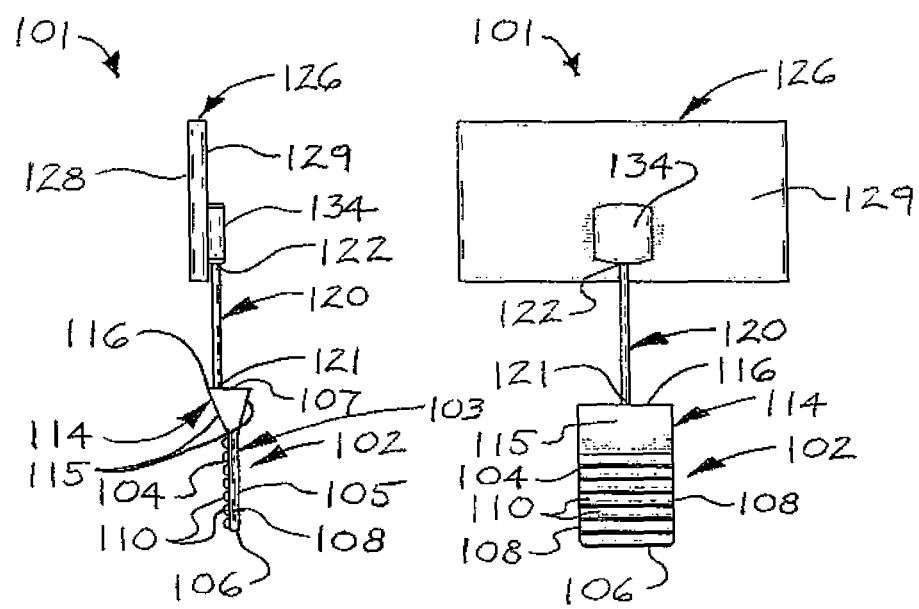
FIG. 6          FIG. 7

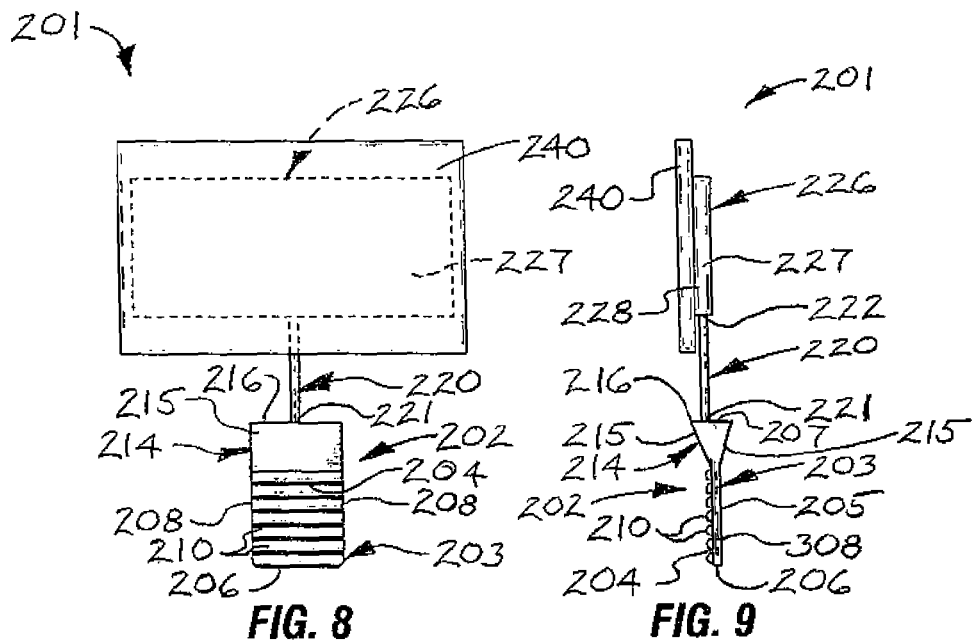
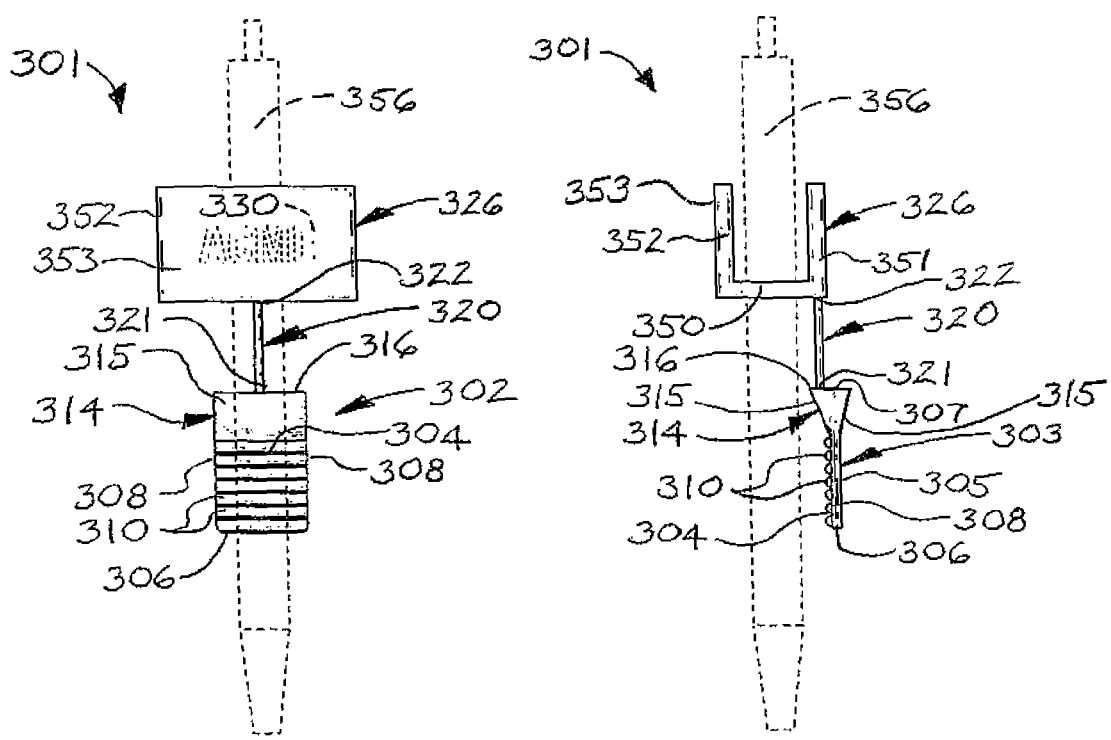
FIG. 8    FIG. 9    FIG. 10    FIG. 11

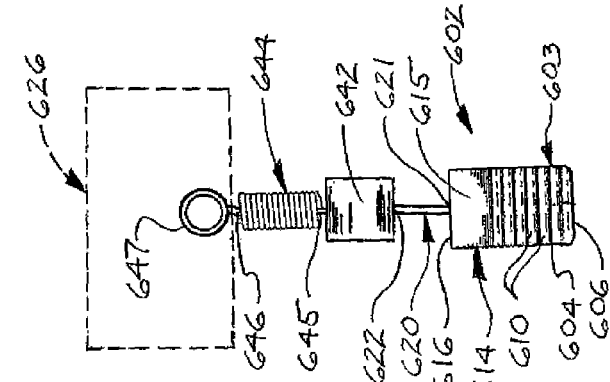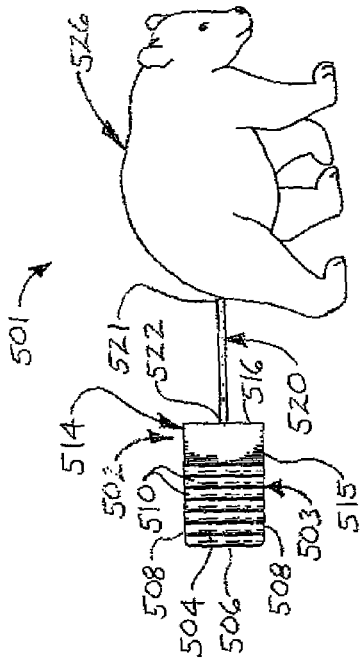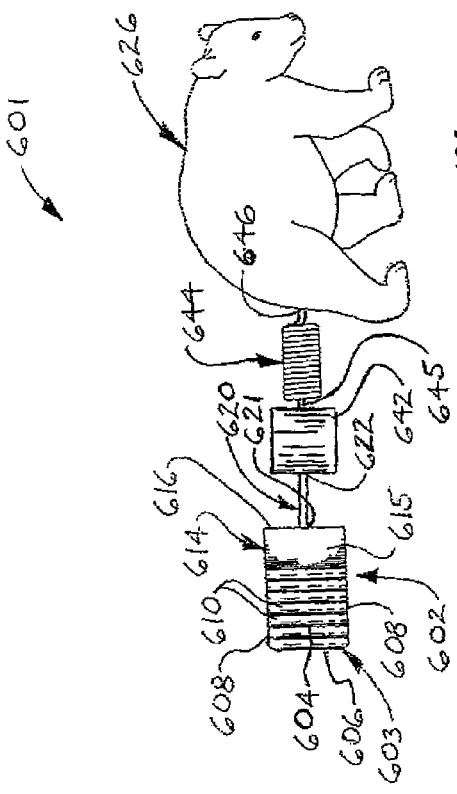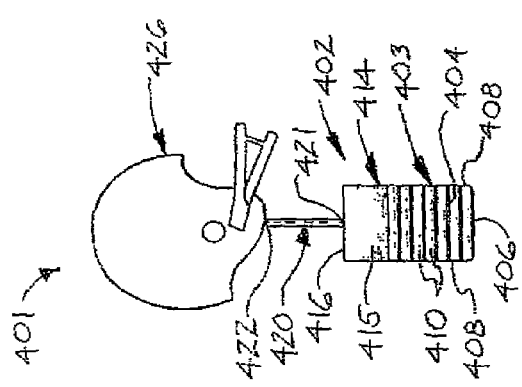

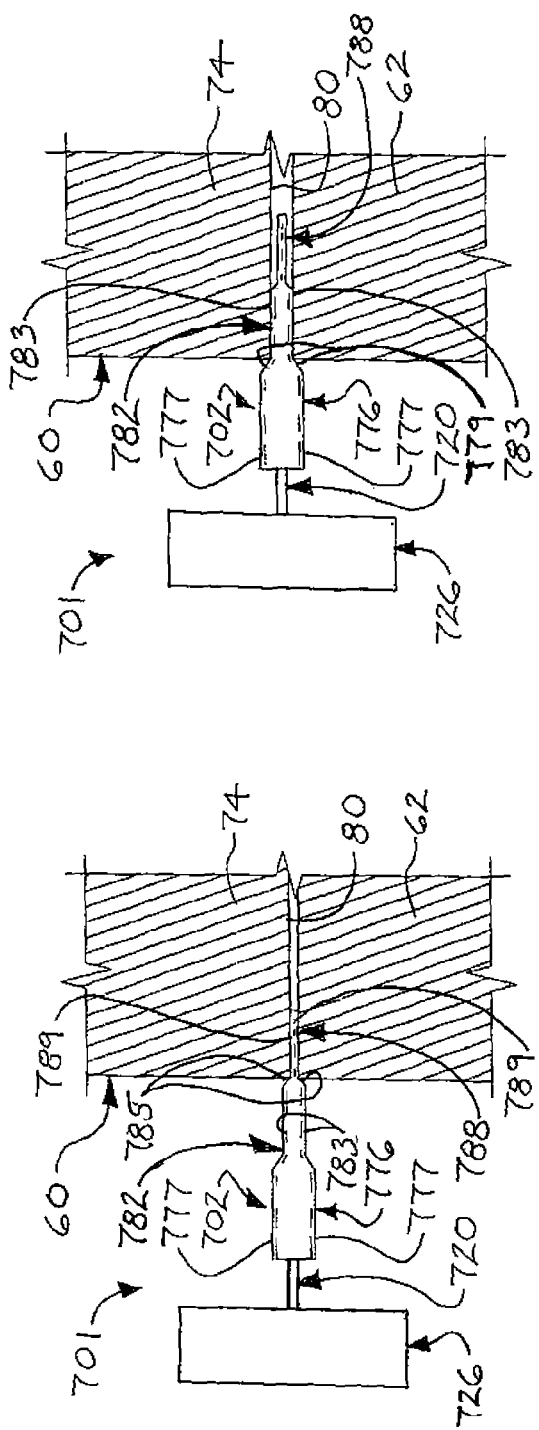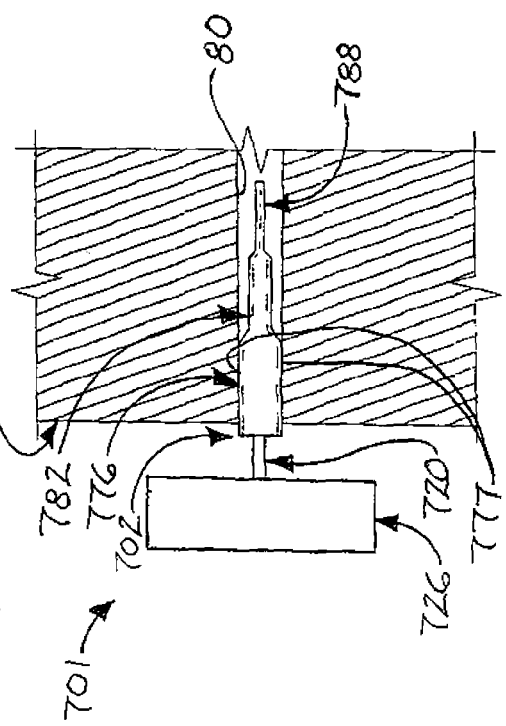
FIG. 18
FIG. 19
FIG. 20

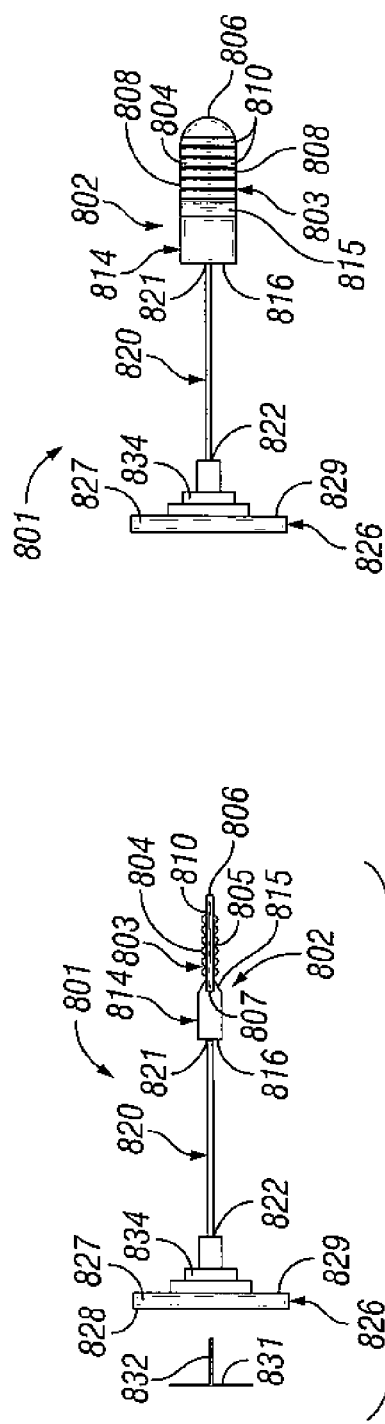
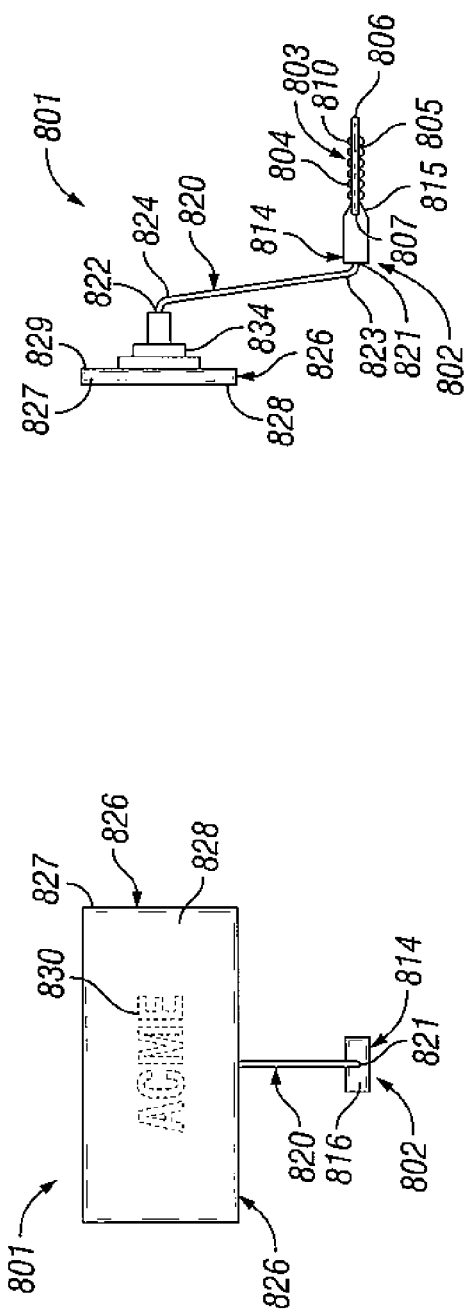

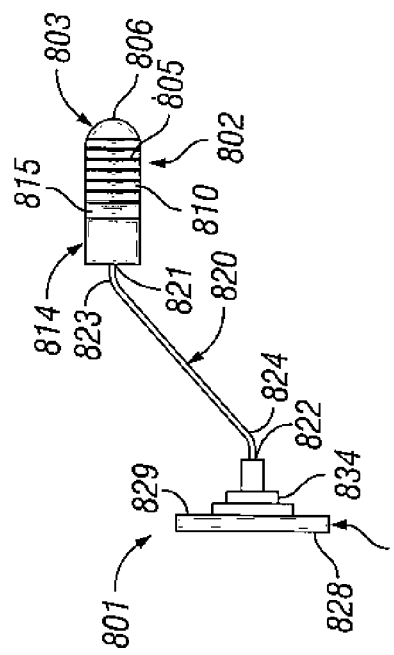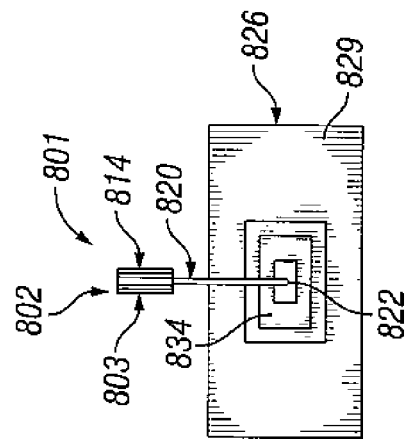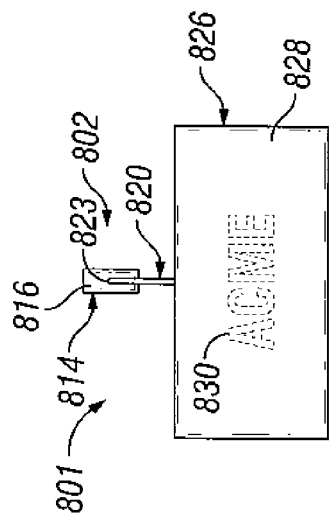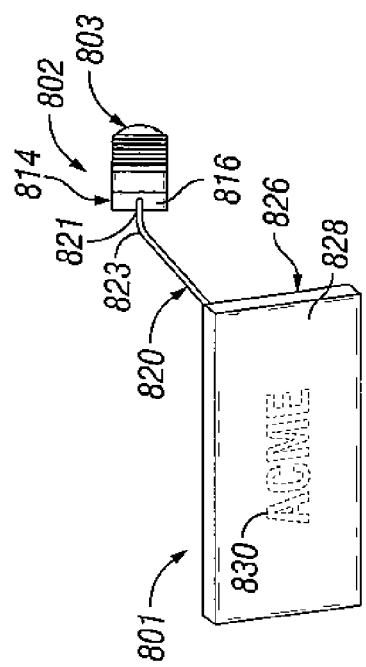

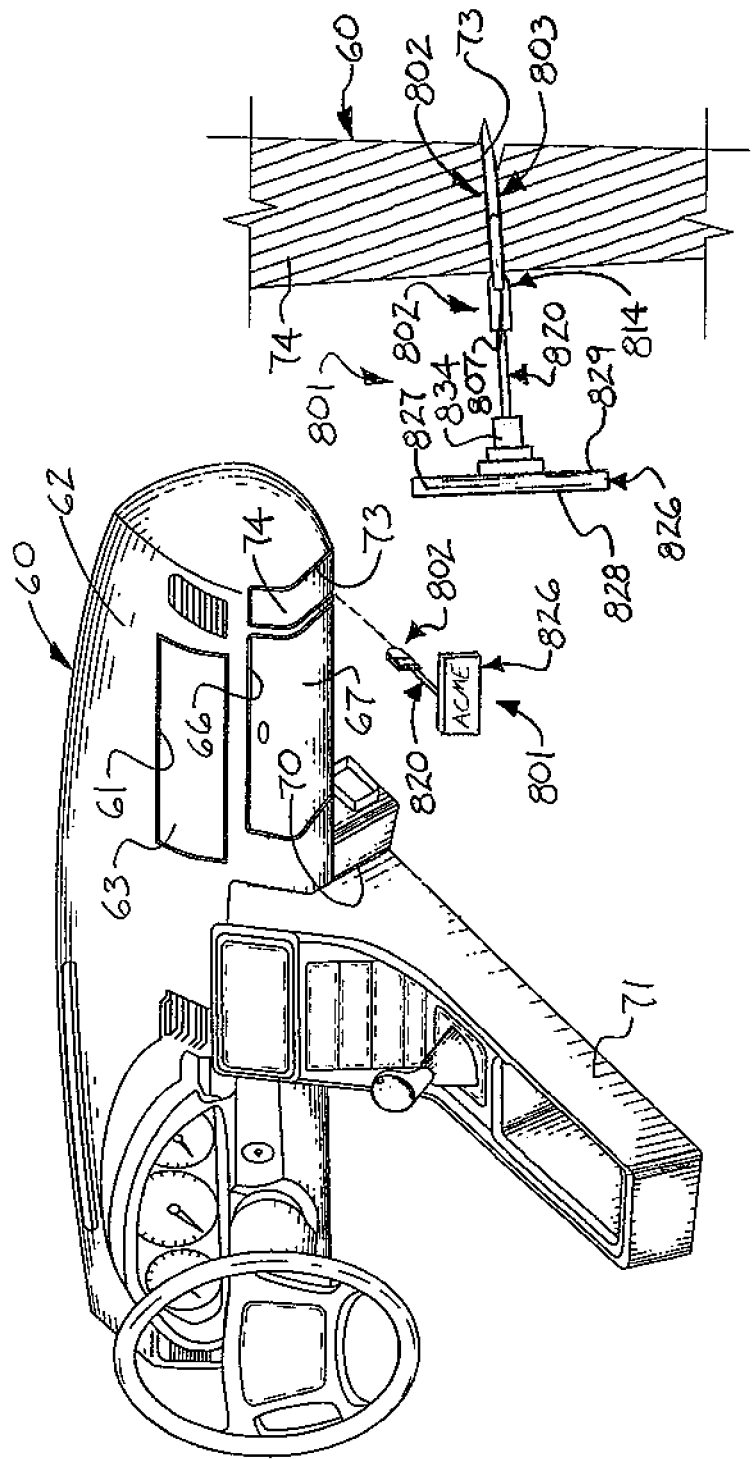

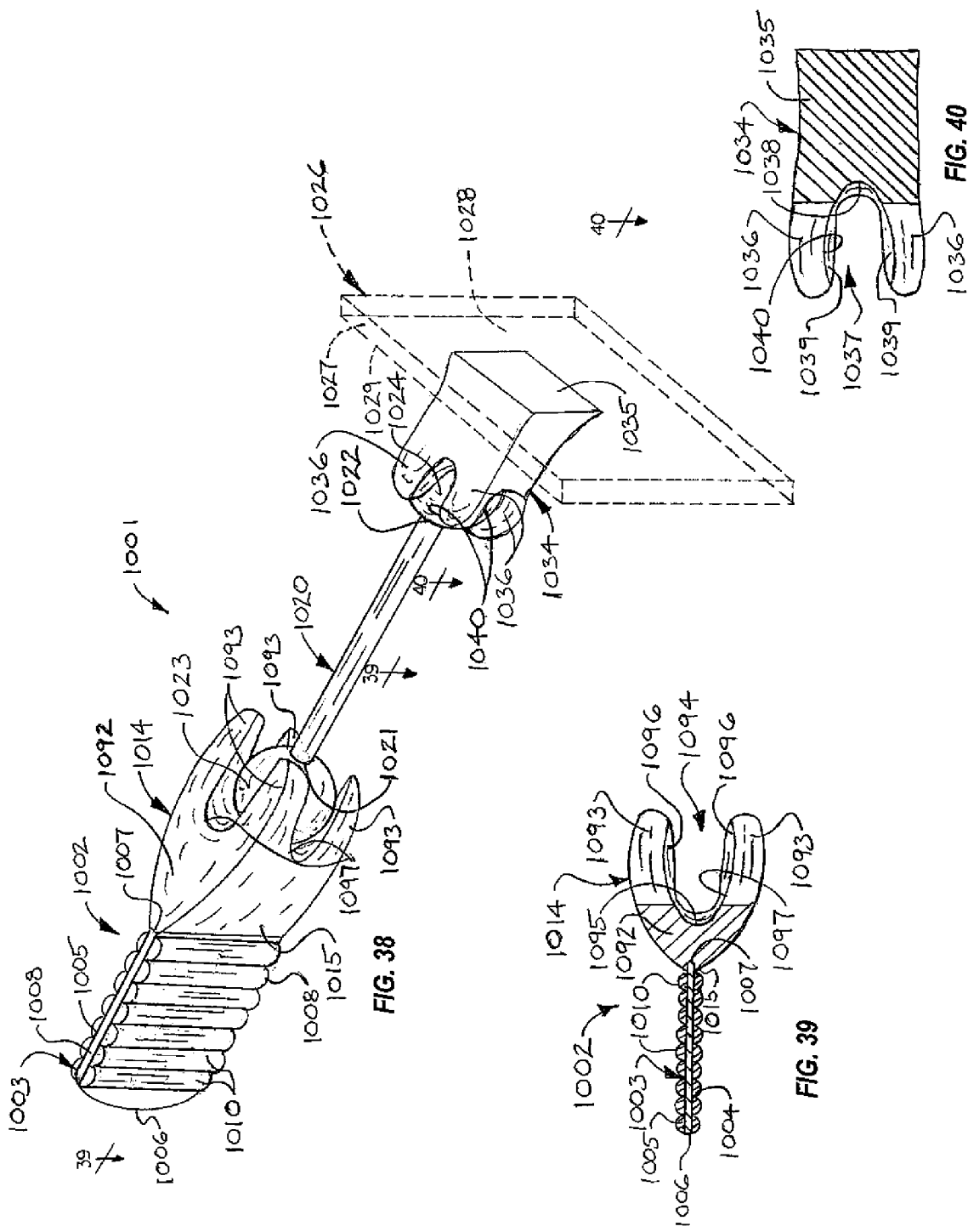

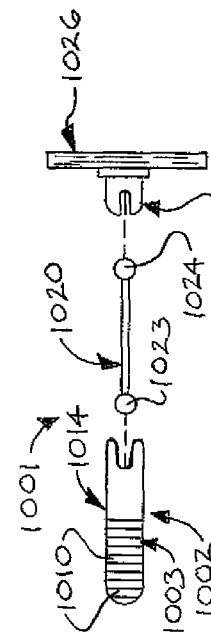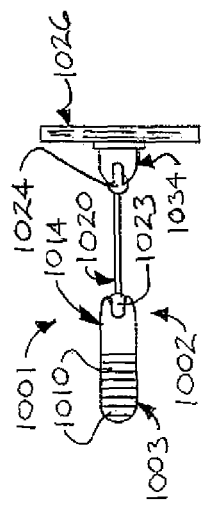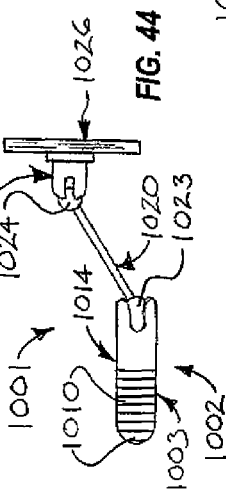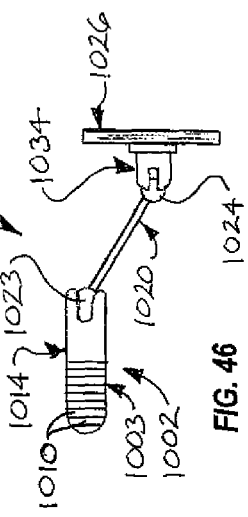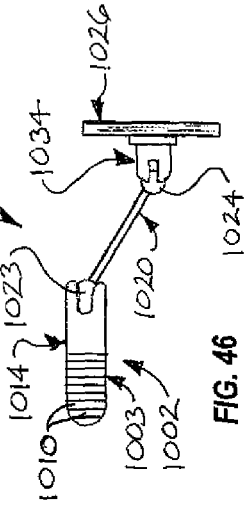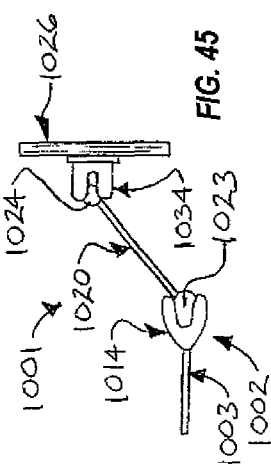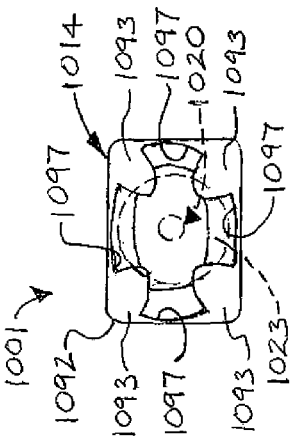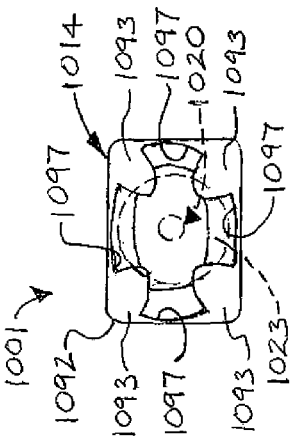

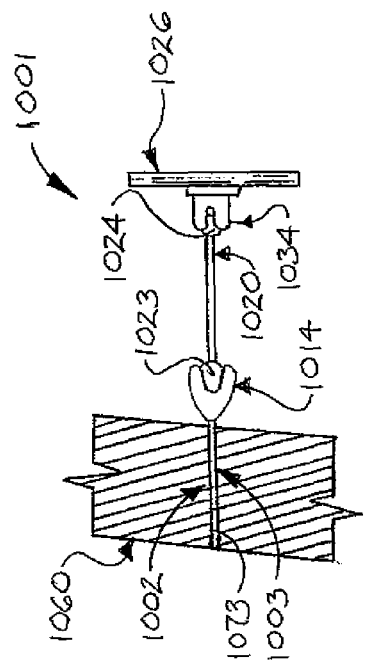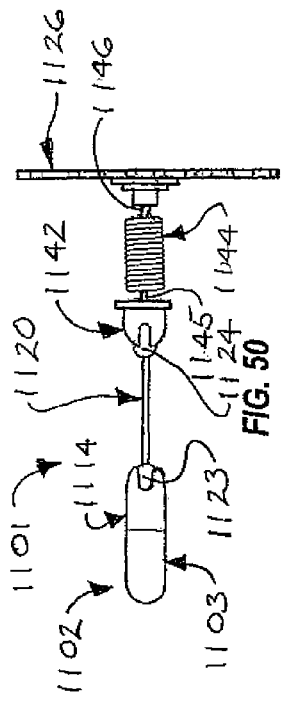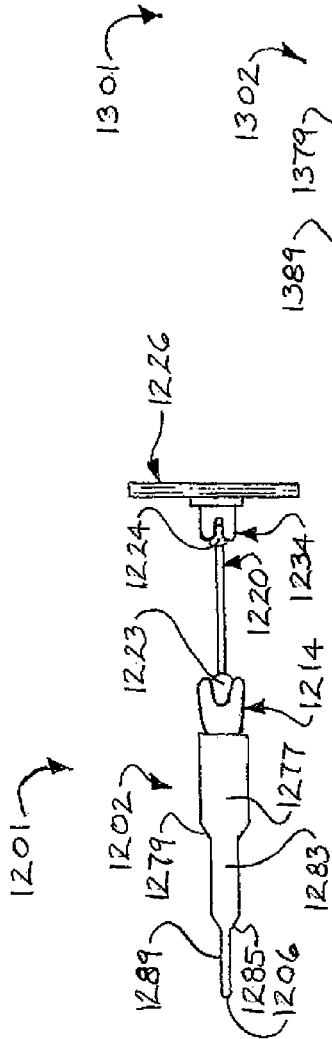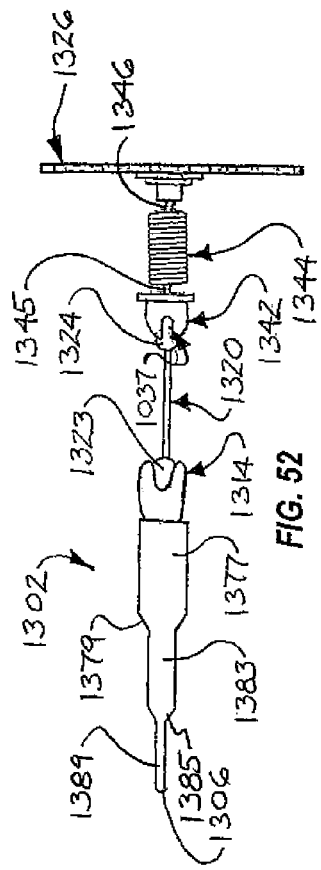

UNIVERSALLY POSITIONAL ARTICLE MOUNTING ASSEMBLIES AND METHODS

CROSS-REFERENCE TO RELATED APPLICATIONS

This is a continuation-in-part of U.S. application Ser. No. 14/591,443, filed Jan. 7, 2015 and entitled UNIVERSALLY POSITIONAL ARTICLE MOUNTING ASSEMBLIES AND METHODS, which application is incorporated by reference herein in its entirety.

FIELD

Illustrative embodiments of the disclosure generally relate to articles. More particularly, illustrative embodiments of the disclosure relate to universally positional article mounting assemblies and methods which facilitate removable attachment and universal positioning of various articles such as advertising or decorative elements, note pads, writing implements and the like to the interior of a vehicle in visible and/or accessible and retrievable locations or positions.

SUMMARY

Illustrative embodiments of the disclosure are generally directed to universally positional article mounting assemblies for mounting an article in a vehicle interior. An illustrative embodiment of the universally positional article mounting assemblies includes a mounting tab having a generally flat or planar tab panel including an article mount edge; a tab insert end opposite the article mount edge; a pair of tab side edges extending from the article mount edge to the tab insert end; a first panel surface; and a second panel surface; a substantially universally manipulatable article stem carried by the article mount edge of the tab panel, the article stem having an elongated article stem axis; and at least one article carried by the article stem, the at least one article disposed within an article plane and the article plane normally generally perpendicular to the article stem axis of the article stem.

In some embodiments, the universally positional article mounting assemblies may include a mounting tab having a tab base having a tab base thickness; a tab middle segment extending from the tab base, the tab middle segment having a middle segment thickness less than the tab base thickness of the tab base; a tab insertion segment extending from the tab middle segment, the tab insertion segment having an insertion segment thickness less than the middle segment thickness of the tab middle segment; and a tab socket carried by the tab base of the mounting tab, the tab socket having a tab socket interior; an article stem carried by the tab socket interior in articulating relationship to the tab socket; a spring mount base carried by the article stem in articulating relationship to the article stem, the spring mount base having a spring mount base socket interior receiving the article stem; an article spring carried by the spring mount base; and at least one article carried by the article spring.

BRIEF DESCRIPTION OF THE DRAWINGS

Illustrative embodiments of the disclosure will now be described, by way of example, with reference to the accompanying drawings, in which:

FIG. 1 is a front view of an illustrative embodiment of the universally positional article mounting assemblies;

FIG. 2A is a side view of the illustrative universally positional article mounting assembly illustrated in FIG. 1;

FIG. 2B is an enlarged side view of a typical mounting tab of an illustrative universally positional article mounting assembly, more particularly illustrating various thicknesses for different lengths or portions of the mounting tab;

FIG. 3 is a perspective view of an illustrative universally positional article mounting assembly, with a bendable article stem of the assembly disposed in a 90-degree bend and partially rotated or twisted to deploy an article at a selected orientation for viewing in attachment of the article to a vehicle interior (not illustrated);

FIG. 4 is a perspective view of an illustrative universally positional article mounting assembly, with the bendable article stem of the assembly disposed in an obtuse angle bend to deploy the article at a selected orientation for display in the vehicle interior;

FIG. 5 is a front view of an illustrative universally positional article mounting assembly, with the article stem disposed in a gradual bend and the article deployed in another orientation for display in the vehicle interior;

FIG. 6 is a side view of an alternative illustrative embodiment of the universally positional article mounting assemblies;

FIG. 7 is a rear view of the alternative universally positional article mounting assembly illustrated in FIG. 6;

FIG. 8 is a front view of yet another illustrative embodiment of the universally positional article mounting assemblies, with a note pad attached to the article (illustrated in phantom) of the assembly;

FIG. 9 is a side view of the illustrative universally positional article mounting assembly illustrated in FIG. 8;

FIG. 10 is a front view of still another illustrative embodiment of the universally positional article mounting assemblies, with a writing implement (illustrated in phantom) deployed in the universally positional article mounting assembly for selective retrieval and use by an occupant of the vehicle;

FIG. 11 is a side view of the illustrative universally positional article mounting assembly illustrated in FIG. 10, with the writing implement (illustrated in phantom) deployed in the assembly;

FIG. 14 is a front view of a non-limiting example of the universally positional article mounting assemblies, with the article in the shape of a football helmet for display in the vehicle interior;

FIG. 15 is a front view of another non-limiting example of the universally positional article mounting assemblies, with the article in the shape of a bear for display in the vehicle interior;

FIG. 16A is a front view of yet another alternative illustrative embodiment of the universally positional article mounting assemblies, with an article stem extending from the mounting tab and an article spring supported by the article stem, more particularly illustrating an article in the form and appearance of a bear mounted to the article spring;

FIG. 16B is a front view of yet another alternative illustrative embodiment of the universally positional article mounting assemblies, with an article stem extending from the mounting tab and an article spring supported by the article stem, more particularly illustrating an article in the form of a display panel connected to an article mounting loop on the article spring;

FIG. 18 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a narrow crevice in the vehicle interior in typical application of the assembly;

FIG. 19 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a crevice of intermediate width in the vehicle interior in typical application of the assembly;

FIG. 20 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a wide crevice in the vehicle interior in typical application of the assembly;

FIG. 22 is a top view of a still further alternative illustrative embodiment of the universally positional article mounting assembly;

FIG. 23 is a side view of the illustrative universally positional article mounting assembly illustrated in FIG. 22;

FIG. 24 is a front view of the illustrative universally positional article mounting assembly illustrated in FIG. 22 with the article stem configured such that the article is disposed above the mounting tab of the assembly;

FIG. 25 is a side view of the illustrative universally positional article mounting assembly illustrated in FIG. 24;

FIG. 26 is a front view of the illustrative universally positional article mounting assembly illustrated in FIG. 22 with the article stem configured such that the article is disposed beneath the mounting tab of the assembly;

FIG. 27 is a side view of the illustrative universally positional article mounting assembly illustrated in FIG. 26;

FIG. 28 is a perspective view of the illustrative universally positional article mounting assembly illustrated in FIG. 22 with the article stem configured such that the article is disposed beneath and to the side of the mounting tab of the assembly;

FIG. 29 is a rear view illustrative universally positional article mounting assembly illustrated in FIG. 22 with the article stem configured such that the article is disposed beneath the mounting tab of the assembly;

FIG. 30 is a front perspective view of a vehicle interior, with an illustrative universally positional article mounting assembly shown in exploded view in typical engagement of the assembly with a crevice in the vehicle interior for attachment of an article to the vehicle interior;

FIG. 31 is an enlarged cross-sectional view of a portion of the vehicle interior, with the mounting tab of the illustrative universally positional article mounting assembly inserted in a crevice in the vehicle interior in attachment of the assembly to the vehicle interior according to typical application of the assembly;

FIG. 38 is a perspective view, partially in phantom, of yet another alternative illustrative embodiment of the universally positional article mounting assemblies;

FIG. 39 is a sectional view, taken along section lines 39-39 in FIG. 38, of the illustrative universally positional article mounting assembly;

FIG. 40 is a sectional view, taken along section lines 40-40 in FIG. 38, of the universally positional article mounting assembly;

FIG. 41 is a side view of the illustrative universally positional article mounting assembly;

FIG. 42 is an exploded side view of the illustrative assembly;

FIG. 43 is a top view of the illustrative assembly, with an article in a front position relative to the mounting tab;

FIG. 44 is a side view of the illustrative assembly, with the article in a raised position relative to the mounting tab;

FIG. 45 is a top view of the illustrative assembly, with the article positioned to the right of the mounting tab;

FIG. 46 is a side view of the illustrative assembly, with the article in a lowered position relative to the mounting tab;

FIG. 47 is a top view of the illustrative assembly, with the article positioned to the left of the mounting tab;

FIG. 48 is a front view of a typical mounting tab of the illustrative assembly with a proximal stem ball on the article stem inserted in a companion tab socket on the mounting tab;

FIG. 49 is a top view of the illustrative assembly with the mounting tab inserted in a crevice in a vehicle interior (illustrated in cross-section) in typical application of the assembly;

FIG. 50 is side view of yet another alternative illustrative embodiment of the article mounting assemblies;

FIG. 51 is a top view of still another alternative illustrative embodiment of the article mounting assemblies; and FIG. 52 is a top view of a still further alternative illustrative embodiment of the article mounting assemblies.

DETAILED DESCRIPTION

Figures 12, 12A:
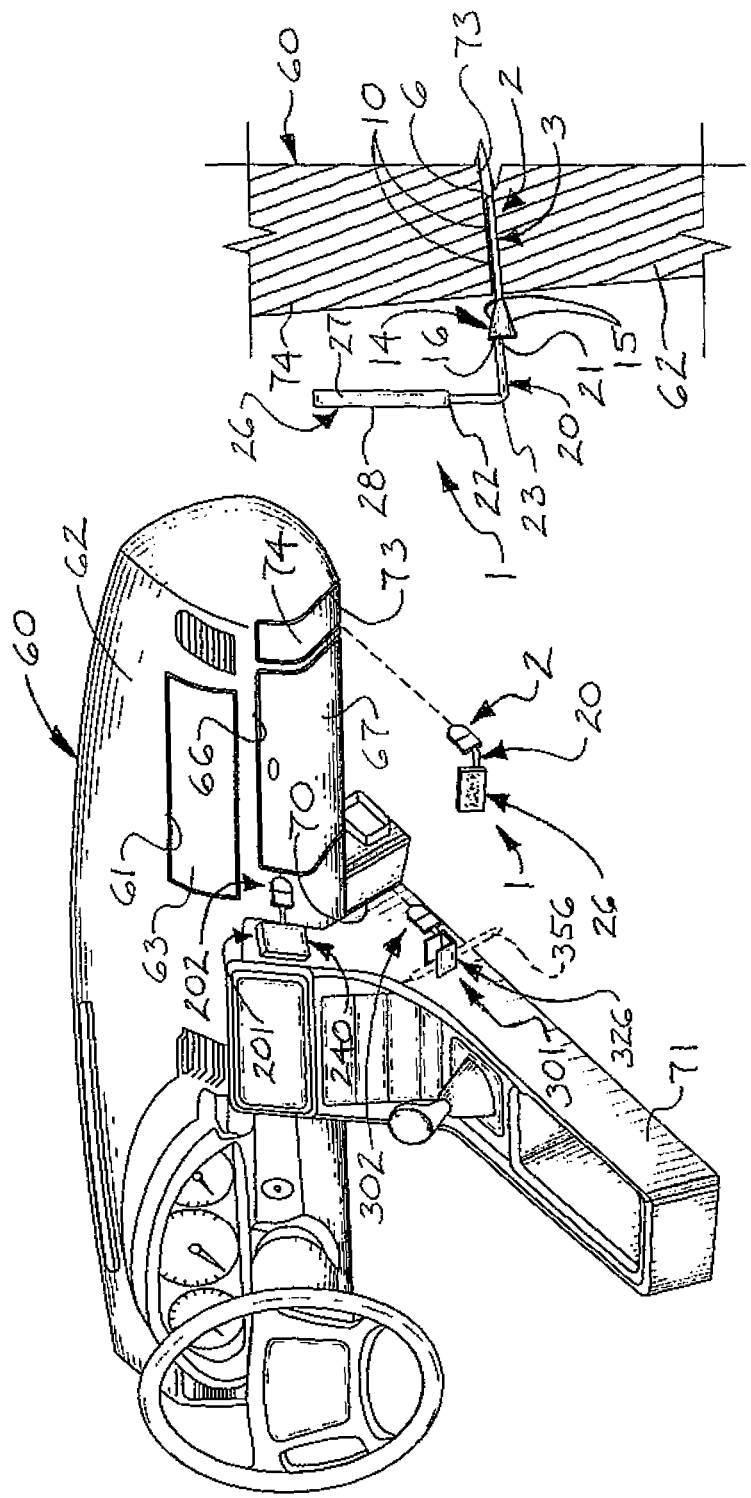
FIG. 12 is a front perspective view of a vehicle interior, with multiple illustrative universally positional article mounting assemblies shown in exploded view in typical engagement of the assemblies with crevices in the vehicle interior for attachment of the articles to the vehicle interior.
FIG. 12A is an enlarged cross-sectional view of a portion of the vehicle interior, with the mounting tab of the illustrative universally positional article mounting assembly inserted in a crevice in the vehicle interior in attachment of the assembly to the vehicle interior according to typical application of the assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementation provided to enable a person skilled in the art to practice the disclosure and are not intended to limit the scope of the appended claims. Moreover, the illustrative embodiments described herein are not exhaustive and embodiments were implementations other than those which are described herein in which fall within the scope of the appended claims are possible. Furthermore, there is no intention to be bound by any expressed or implied theory presented in the preceding technical field, background, brief summary or the following detailed description.

Referring initially to FIGS. 1-5 of the drawings, an illustrative embodiment of the universally positional article mounting assemblies, hereinafter assembly, is generally indicated by reference numeral 1. The assembly 1 is suitable for mounting at least one article 26 at a selected location or position within a vehicle interior 60 (FIG. 12) of a vehicle in typical application of the assembly 1, which will be hereinafter described. The vehicle interior 60 may include but is not limited to the vehicle dashboard, vehicle center console, vehicle ceiling and interior of the vehicle door (not illustrated). The at least one article 26 may include any object or medium which is to be displayed for viewing and/or access and retrieval for use by an occupant of the vehicle. Non-limiting examples of the article 26 include physical embodiments of a two-dimensional or three-dimensional design, shape, symbol or image; advertising insignia; sports team images, logos and/or names; slogans, sayings or quotes; note pads; pencils, pens and other writing implements; skin moisturizing formulations; and support structures or holders which support or hold one or more secondary articles for display and/or use.

The assembly 1 includes a mounting tab 2. A multipositional or universally manipulatable article stem 20 extends from the mounting tab 2. The article 26 is supported by and may be attached to the article stem 20 according to any suitable technique which is known by those skilled in the art. As illustrated in FIGS. 3-5 and will be hereinafter described, the article stem 20 can be selectively bended, rotated, twisted and/or otherwise universally spatially manipulated into a desired two-dimensional or three-dimensional position or configuration to support or hold the article 26 on the vehicle interior 60 in a desired orientation for display and/or retrieval and use by one or more occupants of the vehicle.

The mounting tab 2 may include a generally flat or planar tab panel 3 which may be generally elongated and rectangular in some embodiments. The tab panel 3 may be fabricated of paper, plastic, rubber, metal and/or other rigid or semi-rigid material which facilitates insertion of the tab panel 3 into a crack, gap, joint, seam or crevice (hereinafter crevice, illustrated as reference numerals 61, 66, 70 and 73, respectively, in FIG. 12) between adjacent panels or components in a vehicle dashboard or other location or position in the vehicle interior 60 to mount the article 26 in a selected visible and/or accessible and retrievable location or position within the vehicle interior 60. In the non-limiting example illustrated in FIGS. 12 and 13, a first crevice 61 extends between a main dashboard portion 62 and an airbag cover 63 in the vehicle interior 60. A second crevice 66 extends between the main dashboard portion 62 and a vehicle glove compartment door 67. A third crevice 70 extends between the main dashboard portion 62 and a vehicle center console 71. A fourth crevice 73 extends between the main dashboard portion 62 and a dashboard panel 74. However, in various applications of the assembly 1, the mounting tab 2 may be inserted into crevices (not illustrated) in other locations, positions, areas, compartments or components within the vehicle interior 60, including but not limited to the vehicle ceiling and interior of a vehicle door (not illustrated).

In some embodiments, the tab panel 3 of the mounting tab 2 may be generally elongated with a first panel surface 4, a second panel surface 5, a tab insert end 6, an article mount edge 7 and a pair of tab side edges 8 which extend between the tab insert end 6 and the article mount edge 7. The tab side edges 8 may be generally parallel to each other. Alternatively, the tab side edges 8 may gradually taper toward each other from the article mount edge 7 to the tab insert end 6. Thus, the tab insert end 6 may be rounded or pointed in some embodiments.

In some embodiments, a tab head 14 may protrude from at least one of the first panel surface 4 and the second panel surface 5 of the tab panel 3. In some embodiments, the tab head 14 may be molded and/or otherwise fabricated integrally with the tab panel 3 of the mounting tab 2. In other embodiments, the tab head 14 may be applied to the tab panel 3 according to the knowledge of those skilled in the art. The tab head 14 may be generally wedge-shaped with a stem mount surface 16 which may be generally flush or even with the article mount edge 7 of the tab panel 3. A beveled vehicle interior engaging surface 15 may slope or angle from the stem mount surface 16 toward the tab insert end 6 and terminate at the first panel surface 4 and/or the second panel surface 5 of the tab panel 3. In some embodiments, multiple tab ridges 10 may protrude from at least one of the first panel surface 4 and the second panel surface 5 between the vehicle interior engaging surface 15 of the tab head 14 and the tab insert end 6 of the tab panel 3 in a selected number and pattern. The tab head 14 may gradually increase the width of the mounting tab 2 to facilitate secure insertion of the mounting tab 2 into crevices having a wide variety of widths and increase the number of possible locations or positions which a user can select to mount the assembly 1 within the vehicle interior 60, as will be hereinafter described. In alternative embodiments, the mounting tab 2 may be substantially uniform in thickness from the tab insert end 6 to the article mount edge 7.

As illustrated in FIG. 2B, the tab panel 3 of the mounting tab 2 may have a tab panel thickness 11. The tab panel 3 and each of the tab ridges 10 together may have a combined tab ridge thickness 12. The tab panel 3 and the tab head 14 may together have a combined tab head thickness 18. In some embodiments, the tab panel thickness 11 of the mounting tab 2 may be at least about 0.5 mm. The tab ridge thickness 12 may be at least about 0.7 mm. The tab head thickness 18 may be from about 0.8 mm to about 2.75 mm. Accordingly, in attachment of the assemblies 1 to the vehicle interior 60, which will be hereinafter described, the mounting tab 2 is configured to insert into selected crevices 61, 66, 70, 73 having different widths in the vehicle interior 60 to tightly engage the interior surfaces of the crevices and securely support the assemblies 1 at the selected positions or locations on the vehicle interior 60.

The article stem 20 may include any bendable, pliable or workable metal or material which holds its position upon being spatially bended, twisted and otherwise manipulated and then released. Non-limiting examples of materials which are suitable for the article stem 20 include steel, lead, copper, aluminum and combinations thereof. The article stem 20 may have a flat, round or other cross-section which may be constant or variable along its length. The article stem 20 may include a proximal stem end 21 which is attached to the stem mount surface 16 of the tab head 14 and a distal stem end 22 which is opposite the proximal stem end 21. As used herein, "proximal" means closer to the mounting tab 2 and "distal" means farther from the mounting tab 2. The article 26 may be attached to the distal stem end 22 of the article stem 20 using any suitable attachment technique which is known by those skilled in the art. For example and without limitation, in some embodiments, the article 26 may be attached to the distal stem end 22 of the article stem 20 using glue, adhesive, magnetic attachment mechanism or the like. In other embodiments, the distal stem end 22 may be threaded or inserted into or embedded within the article 26. To this end, in some embodiments the distal stem end 22 portion of the article stem 20 may be shaped, looped, coiled or bent to provide an enlarged surface area on which to securely mount the article 26 to the article stem 20 and prevent inadvertent rotation of the article 26 relative to the article stem 20. In still other embodiments, the distal stem end 22 may be molded, laminated or otherwise fabricated integrally with the article 26 according to the knowledge of those skilled in the art.

The at least one article 26 of the assembly 1 may include any type of device, article or two-dimensional or three-dimensional display or medium which a user of the assembly 1 desires to mount on the vehicle interior 60 in a visible or accessible and retrievable location or position and orientation. A non-limiting example of the article 26 includes a flat article panel 27 which may have a display surface 28. Indicia 30 such as advertising information, a sports team logo, saying, slogan, quote or the like may be provided for display on the display surface 28. Photos (not illustrated) and/or other displayable media may be affixed to the display surface 28 using a suitable adhesive (not illustrated), magnetic attachment mechanism or other technique. In some embodiments, a clear or transparent laminated display cover (not illustrated) may be provided on the display surface 28 for insertion of photos and/or other displayable medium for display. In other embodiments, the article 26 may include a sports team logo, symbol, image or panel which is shaped in the form of a football helmet, animal or other object. In still other embodiments, the article 26 may include a note pad, writing implement, skin moisturizing composition or other article which may be useful to one or more occupants of the vehicle.

As illustrated in FIGS. 3-5, the article stem 20 can be bended, twisted and/or otherwise physically manipulated to orient the article 26 at a selected two-dimensional or three-dimensional spatial orientation relative to the mounting tab 2 in order to optimize the visibility and/or accessibility of the article 26 for retrieval from the vehicle interior 60 and use by an occupant of the vehicle. For example and without limitation, as illustrated in FIG. 3, the article stem 20 can be physically manipulated to form one or more 90-degree bends 23 and/or one or more twists 24 to selectively orient the article 26 at the desired orientation. An obtuse angle bend 32 (FIG. 4) or a gradual bend 25 (FIG. 5) can be induced in the article stem 20 depending upon the desired orientation of the article 26 with respect to the mounting tab 2 and the vehicle interior 60.

Figure 13:
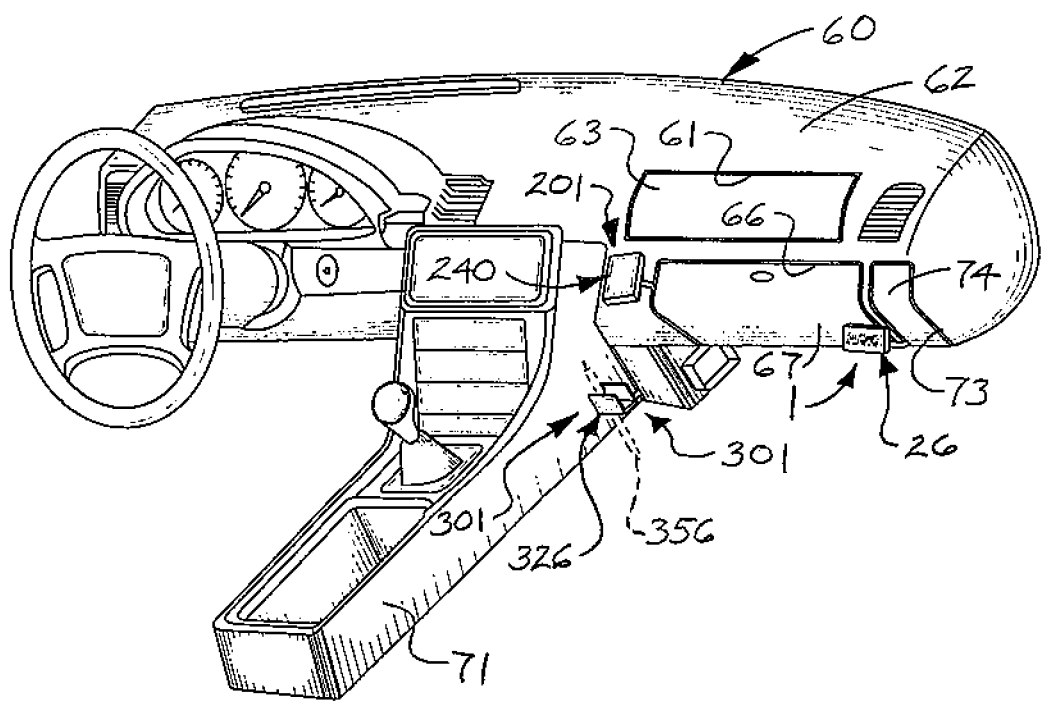
FIG. 13 is a front perspective view of the vehicle interior, with the various universally positional article mounting assemblies deployed in place for viewing and/or access, retrieval and use of the articles by one or more occupants of the vehicle.

Referring next to FIGS. 12, 12A and 13 of the drawings, in typical application of the assembly 1, an article 26 can be mounted in a selected location or position in the vehicle interior 60 to render the article 26 easily visible to and/or accessible and retrievable for use by an occupant of the vehicle. In the non-limiting example illustrated in FIG. 12, the assembly 1 is inserted in a crevice 73 which extends between the main dashboard portion 62 and the dashboard panel 74 on the dashboard in the vehicle interior 60. The article stem 20 may be bended, twisted and/or otherwise physically manipulated to spatially orient the article 26 in such a manner that the article 26 will be visible to occupants of the vehicle when the mounting tab 2 of the assembly 1 is inserted in the crevice 73. Accordingly, after the article stem 20 is suitably manipulated, the mounting tab 2 is inserted in the crevice 73. Alternatively, the article stem 20 may be manipulated after the mounting tab 2 is inserted in the crevice 73. As illustrated in FIG. 12A, the tab ridges 10 on the tab panel 3 of the mounting tab 2 may frictionally engage one of the interior surfaces of the crevice 73 to stabilize the mounting tab 2 within the crevice 73. In some applications, depending upon the width of the crevice 73, the mounting tab 2 may be inserted in the crevice 73 to an extent that the beveled vehicle interior engaging surface or surfaces 15 on the tab head 14 engages the interior surface of the crevice 73 to secure or wedge the mounting tab 2 within the crevice 73. As further illustrated in FIG. 12A, the article 26 may be oriented in generally parallel relationship to the plane of the vehicle interior 60 such that the insignia 30 (FIG. 4) on the article panel 27 of the article 26 is easily visible to a passenger (not illustrated) who sits in the passenger seat of the vehicle. The article 1 can be easily removed or detached from the vehicle interior 60 by pulling the mounting tab 2 from the crevice 73.

Referring next to FIGS. 6 and 7 of the drawings, an alternative illustrative embodiment of the dashboard mounting article assemblies is generally indicated by reference numeral 101. In the assembly 101, elements which are analogous to the respective elements of the assembly 1 that was heretofore described with respect to FIGS. 1-5 are designated by the same numerals in the 101-199 series in FIGS. 6 and 7. Unless otherwise noted, the elements and features of the assembly 101 may encompass the same descriptions which were heretofore applied to the assembly 1. A article mounting pad 134 may secure the distal stem end 122 of the article stem 120 to a stem attachment surface 129 on the article 126. In some embodiments, the article mounting pad 134 may include glue and/or other adhesive. In other embodiments, the article mounting pad 134 may include plastic, rubber and/or other material which is molded or otherwise fabricated integrally with the article 126, or fabricated separately and attached to the article 126 according to the knowledge of those skilled in the art. Accordingly, the article mounting pad 134 may be attached to the article 126 using an adhesive (not illustrated), magnetic attachment mechanism (not illustrated) or other attachment technique which is known by those skilled in the art. Typical application of the assembly 101 may be as was heretofore described with respect to the assembly 1 in FIGS. 12, 12A and 13.

Referring next to FIGS. 8 and 9 of the drawings, another alternative illustrative embodiment of the dashboard mounting article assemblies is generally indicated by reference numeral 201. In the assembly 201, elements which are analogous to the respective elements of the assembly 1 that was heretofore described with respect to FIGS. 1-5 are designated by the same numerals in the 201-299 series in FIGS. 8 and 9. Unless otherwise noted, the elements and features of the assembly 201 may encompass the same descriptions which were heretofore applied to the assembly 1. The assembly 201 may include an article 226 which is adapted to hold at least one secondary article such as a note pad 240, such as a POST-IT® note pad, for example and without limitation, at a selected optimum location or position in the vehicle interior 60 for retrieval and use by an occupant in the vehicle. The article 226 may include an article panel 227 which is suitable for supporting the note pad 240. The note pad 240 may be secured to a pad attachment surface 228 (FIG. 9) on the article panel 227 using a suitable adhesive (not illustrated), for example and without limitation.

Referring again to FIGS. 12 and 13 of the drawings, typical application of the assembly 201 is illustrated. Accordingly, the assembly 201 may be mounted in the vehicle interior 60 (FIG. 12) by inserting the mounting tab 202 in the crevice 66 in the dashboard or in any other desired location or position within the vehicle interior 60. The article stem 220 (FIGS. 8 and 9) may be physically manipulated to position the article 226 and the note pad 240 in a spatial orientation which renders the note pad 240 easily accessible by an occupant of the vehicle. Thus, individual note sheets (not illustrated) may be selectively and individually removed from the note pad 240 for use by the occupant typically without the need to remove the mounting tab 202 of the assembly 201 from the crevice 66.

Referring next to FIGS. 10 and 11 of the drawings, still another alternative illustrative embodiment of the dashboard mounting article assemblies is generally indicated by reference numeral 301. In the assembly 301, elements which are analogous to the respective elements of the assembly 1 which was heretofore described with respect to FIGS. 1-5 are designated by the same numerals in the 301-399 series in FIGS. 10 and 11. Unless otherwise noted, the elements and features of the assembly 301 may encompass the same descriptions which were heretofore applied to the assembly 1. The assembly 301 may include an article 326 which is adapted to hold at least one secondary article such as a pen, pencil or other writing implement 356 (illustrated in phantom) at a selected optimum location or position in the vehicle interior 60 for retrieval and use by an occupant in the vehicle. The article 326 may include a writing implement holder 350 (FIG. 11). A writing implement opening (not illustrated) which is sized and configured to accommodate the writing implement 356 may extend through the writing implement holder 350. As illustrated in FIG. 11, a rear holder panel 351 and a front holder panel 352 may extend from the writing implement holder 350 in spaced-apart relationship to each other. The distal stem end 322 of the article stem 320 may be attached to the writing implement holder 350 at the rear holder panel 351. As illustrated in FIG. 10, the front holder panel 352 may have a display surface 353 on which indicia 330 may be provided. The writing implement 356 can be secured in the writing implement holder 350 of the article 326 by inserting and seating the writing implement 356 in the writing implement opening (not illustrated) in the writing implement holder 350, as illustrated in phantom in FIGS. 10 and 11.

Referring again to FIGS. 12 and 13 of the drawings, typical application of the assembly 301 is illustrated. The mounting tab 302 of the assembly 301 is shown inserted in a crevice 70 in the dashboard or other location in the vehicle interior 60. An occupant in the vehicle can selectively access and retrieve the writing implement 356 from the article 326 for use by removing the writing implement 356 from the writing implement holder 350 (FIG. 11). After use, the writing implement 356 can be replaced in the writing implement holder 350 for subsequent use.

Referring next to FIG. 14 of the drawings, a non-limiting example of an universally positional article mounting assembly is generally indicated by reference numeral 401, in which like elements corresponding to those of the assembly 1 in FIGS. 1-5 are designated by like reference numerals in the 401-499 series. Unless otherwise noted, the elements and features of the assembly 401 may encompass the same descriptions which were heretofore applied to the assembly 1. The article 426 of the assembly 401 is in the shape of a football helmet. Accordingly, the football helmet 426 may commemorate, celebrate or display a favorite football team of the user. The football helmet 426 may additionally display the colors and/or name of the football team.

Referring next to FIG. 15 of the drawings, another non-limiting example of an universally positional article mounting assembly is generally indicated by reference numeral 501, in which like elements corresponding to those of the assembly 1 in FIGS. 1-5 are designated by like reference numerals in the 501-599 series. Unless otherwise noted, the elements and features of the assembly 501 may encompass the same descriptions which were heretofore applied to the assembly 1. In the assembly 501, the article 526 is in the shape of a bear. The bear may represent the mascot of a user's favorite sports team, in which case the article 526 may additionally display the colors and/or name of the team. Alternatively, the article 526 may be colored brown or black to resemble the appearance of a bear. Still further in the alternative, the article 526 may be provided in the shape of an alternative animal the image of which the user desires to display on the vehicle interior 60.

Referring next to FIG. 16A of the drawings, another non-limiting example of an universally positional article mounting assembly is generally indicated by reference numeral 601, in which like elements corresponding to those of the assembly 1 in FIGS. 1-5 are designated by like reference numerals in the 601-699 series. Unless otherwise noted, the elements and features of the assembly 601 may encompass the same descriptions which were heretofore applied to the assembly 1. A universally manipulatable article stem 620 may extend from the tab insert edge 607 of the mounting tab 602. A spring mount base 642 may be provided on the article stem 620. A flexible, coiled article spring 644 may have a proximal spring end 645 which is attached to the spring mount base 642. The article 626 may be attached to a distal spring end 646 of the article spring 620. Thus, the article stem 620, the spring mount base 642 and the article spring 644 may flexibly connect the article 626 to the mounting tab 602. Accordingly, in mounting of the assembly 601 on the vehicle interior 60 (FIG. 12), the article stem 620 facilitates universal positioning capability of the article 626. The flexible article spring 644 facilitates movement of the article 626 relative to the stationary mounting tab 602 during movement of the vehicle. Such movement of the article 626 may engage the attention of the occupants in the vehicle.

Referring next to FIG. 16B of the drawings, another non-limiting example of an universally positional article mounting assembly is generally indicated by reference numeral 601a, in which like elements corresponding to those of the assembly 601 in FIG. 16A are designated by like reference numerals. An article mount loop 647 may terminate the distal spring end 646 of the article spring 644. An article 626 in the shape of a display panel or the like may be inserted in the article mount loop 647. Accordingly, in mounting of the assembly 601 on the vehicle interior 60 (FIG. 12), the article stem 620 facilitates universal positioning capability of the article 626 and the flexible article spring 620 facilitates movement of the article 626 relative to the stationary mounting tab 602 during movement of the vehicle.

Referring next to FIGS. 17-20 of the drawings, another alternative illustrative embodiment of the universally positional article mounting assemblies is generally indicated by reference numeral 701 in FIGS. 18-20. In the assembly 701, elements which are analogous to the respective elements of the assembly 1 that was heretofore described with respect to FIGS. 1-5 are designated by the same numerals in the 701-799 series in FIGS. 17-20. Unless otherwise noted, the elements and features of the assembly 701 may encompass the same descriptions which were heretofore applied to the assembly 1. As particularly illustrated in FIG. 17, the mounting tab 702 of the assembly 701 may include a tab base 776 which may be provided on the distal stem end 722 of the article stem 720 at the article mount edge 707 of the tab panel 703. The tab base 776 has a tab base thickness 778. A tab middle segment 782 may extend from the tab base 776. The tab middle segment 782 has a middle segment thickness 784 which may be less than the tab base thickness 778 of the tab base 776. A tab insertion segment 788 may extend from the tab middle segment 782. The tab insertion segment 788 has an insertion segment thickness 790 which may be less than the middle segment thickness 784 of the tab middle segment 782.

The tab base 776 of the mounting tab 702 may include a pair of opposite, generally planar tab base crevice engaging surfaces 777. The tab base 776 may have a tab base thickness 778 which corresponds to the distance between the tab base crevice engaging surfaces 777. In some embodiments, the tab base thickness 778 of the tab base 776 may range from about 2.25 mm to about 2.75 mm.

The tab middle segment 782 of the mounting tab 702 may have a pair of opposite, generally planar middle segment crevice engaging surfaces 783. A pair of beveled tab base transition surfaces 779 may angle from the tab base crevice engaging surfaces 777 of the tab base 776 to the respective crevice engaging surfaces 783 of the tab middle segment 782. The tab middle segment 782 may have a middle segment thickness 784 which corresponds to the distance between the middle segment crevice engaging surfaces 783. In some embodiments, the middle segment thickness 784 of the tab middle segment 782 may be about 0.8 mm.

Figure 17:
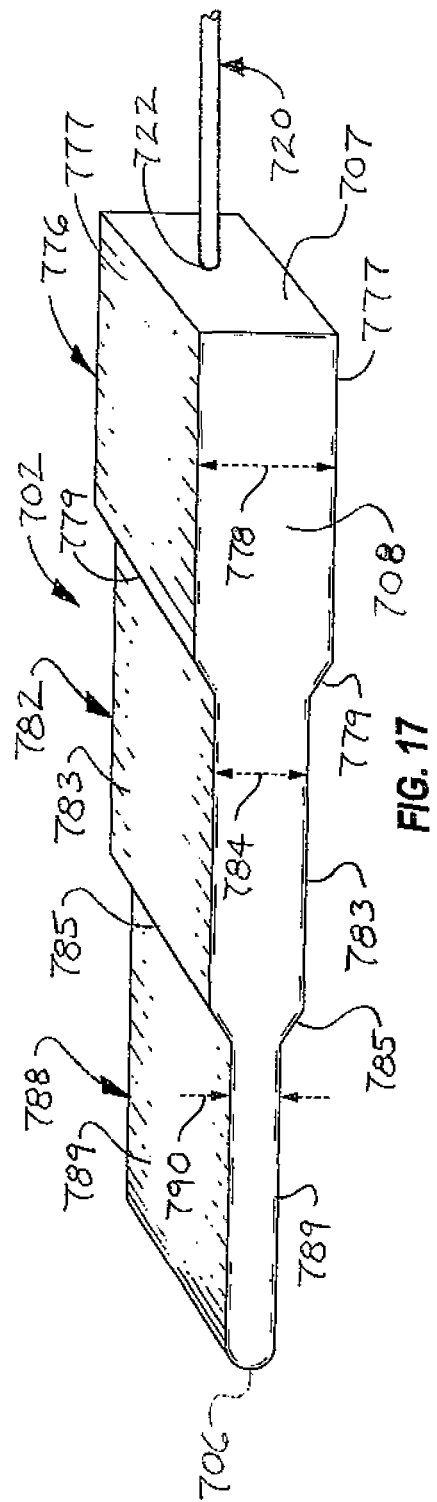
FIG. 17 is a side perspective view of a multi-tiered mounting tab having various thicknesses according to another illustrative embodiment of the universally positional article mounting assemblies.

The tab insertion segment 788 of the mounting tab 702 may include a pair of opposite, planar insertion segment crevice engaging surfaces 789. A pair of beveled middle segment transition surfaces 785 may angle from the middle segment crevice engaging surfaces 783 of the tab middle segment 782 to the respective insertion segment crevice engaging surfaces 789 of the tab insertion segment 788. The tab insertion segment 788 may have an insertion segment thickness 790 which corresponds to the distance between the insertion segment crevice engaging surfaces 789. In some embodiments, the insertion segment thickness 790 may be about 0.5 mm. The tab insertion segment 788 may have a tab insert end 706 which may be generally rounded cross-section, as illustrated in FIG. 17.

As illustrated in FIGS. 18-20, the assembly 701 may be attached to the vehicle interior 60 by inserting the mounting tab 702 into a crevice 80 in the dashboard or other selected location or position within the vehicle interior 60. Accordingly, the tab base thickness 778, the middle segment thickness 784 and the insertion segment thickness 790 (FIG. 17) of the respective tab base 776, tab middle segment 782 and tab insertion segment 788 accommodate the various widths of different crevices 80 in the vehicle interior 60. As illustrated in FIG. 18, under circumstances in which the crevice 80 is about 0.5 mm in width, the tab insertion segment 788 of the mounting tab 702 may be inserted into the crevice 80 with the crevice engaging surfaces 789 (FIG. 17) on the tab insertion segment 788 engaging the respective interior surfaces of the crevice 80. The middle segment transition surfaces 785 on the tab middle segment 782 may engage the vehicle interior 60 as the tab middle segment 782 and the tab base 776 typically remain outside the crevice 80. Thus, the insertion segment thickness 790 (FIG. 17) of the tab insertion segment 788 is sufficient to facilitate snug engagement of the insertion segment crevice engaging surfaces 789 with the respective interior surfaces of the crevice 80 and securely and yet detachably attach or mount the assembly 701 on the vehicle interior 60. As was heretofore described with respect to the assembly 1 in FIGS. 1-5, the article stem 720 can be selectively bent, twisted and/or otherwise physically manipulated to orient the article 726 at a selected two-dimensional or three-dimensional spatial orientation or position for display and/or access, retrieval and use by an occupant of the vehicle.

As illustrated in FIG. 19, under circumstances in which the crevice 80 has a width of about 0.8 mm, both the tab insertion segment 788 and the tab middle segment 782 may be inserted into the crevice 80 with the middle segment crevice engaging surfaces 783 (FIG. 17) on the tab middle segment 782 engaging the respective interior surfaces of the crevice 80. The tab base transition surfaces 779 may engage the vehicle interior 60 as the tab base 776 typically remains outside the crevice 80.

As illustrated in FIG. 20, under circumstances in which the crevice 80 has a width of typically from about 0.25 mm to about 2.75 mm, the tab insertion segment 788, the tab middle segment 782 and the tab base 776 may be inserted into the crevice 80. The tab base crevice engaging surfaces 777 on the tab base 776 engage the respective interior surfaces of the crevice 80. In the foregoing manner, the tab base 776, the tab middle segment 782 and the tab insertion segment 788 facilitate a snug or tight fit of the mounting tab 702 in the crevice 80 irrespective of the various widths of crevices 80 at different locations or positions within the vehicle interior 60.

Figure 21:
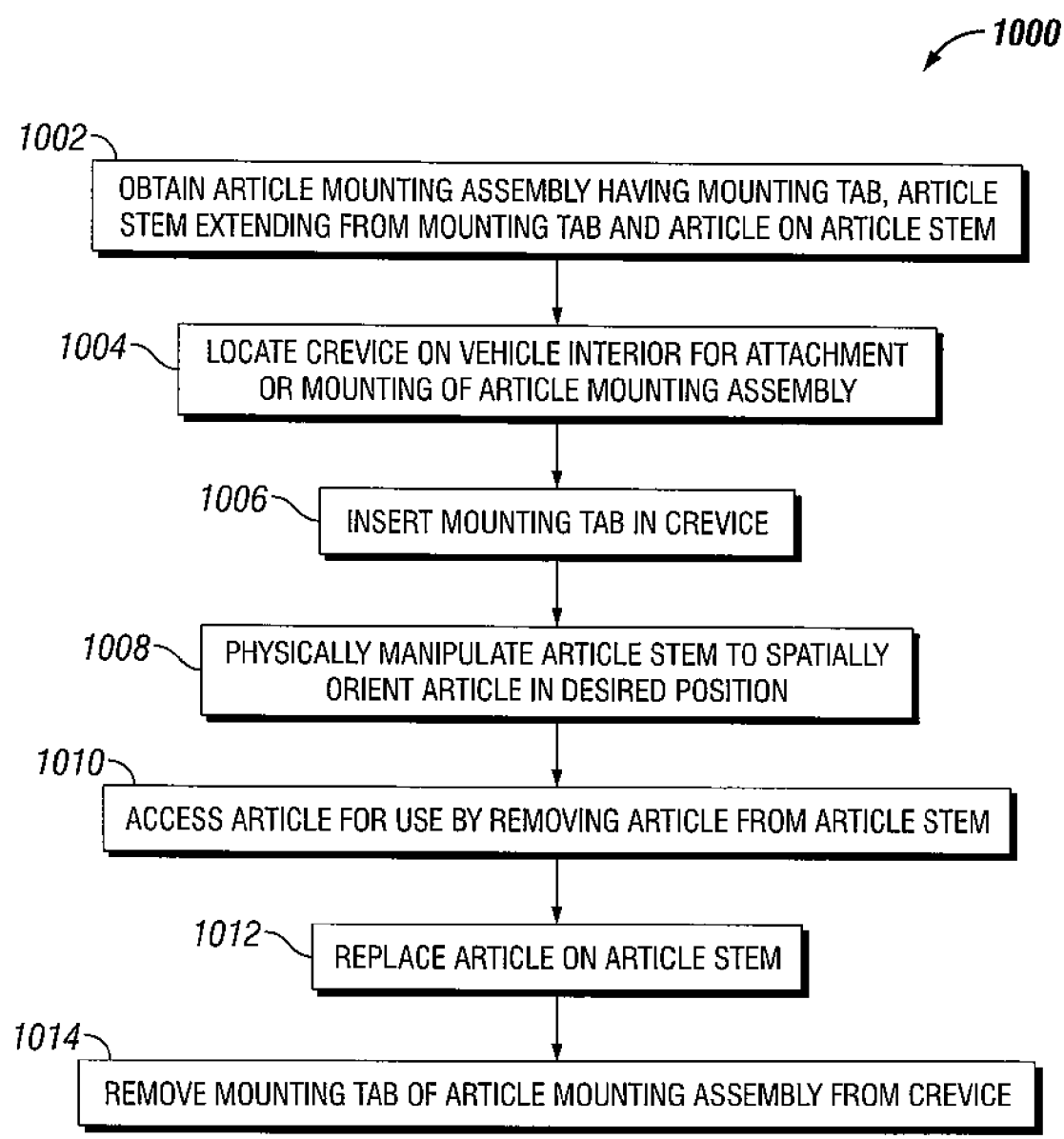
FIG. 21 is a flow diagram of an illustrative embodiment of the universally positional article mounting methods.

Referring next to FIG. 21 of the drawings, a flow diagram of an illustrative embodiment of the universally positional article mounting methods is generally indicated by reference numeral 1000. At block 1002, a universally positional article mounting assembly is obtained. The universally positional article mounting assembly may include a mounting tab, an article stem extending from the mounting tab and at least one article on the article mounting tab. In some embodiments, the article may include at least one primary article and at least one secondary article may be detachably supported by the primary article. The elements and features of the universally positional article mounting assembly may encompass the same descriptions which were heretofore applied to the various illustrative embodiments of the universally positional article mounting assemblies which were heretofore described in the drawings. In some embodiments, the mounting tab may be substantially uniform in thickness throughout its length. The mounting tab may have a thickness of at least about 0.5 mm and preferably, about 0.8 mm.

In some embodiments, the thickness of the mounting tab may range from about 0.5 mm to about 2.75 mm. At block 1004, a crevice on the vehicle interior which is suitable for attachment or mounting of the universally positional article mounting assembly is located. At block 1006, the mounting tab of the universally positional article mounting assembly is inserted in the crevice. At block 1008, the article stem may be physically manipulated to spatially orient the article in the desired position for display and/or access and retrieval of the article for use.

At block 1010, in some embodiments, the article may be accessed for use by removing the article from the article stem. Alternatively, at least one secondary article may be removed from at least one primary article on the article stem for use. After use, at block 1012 the article may be replaced on the article stem or the secondary article may be replaced on the primary article. At block 1014, the mounting tab of the universally positional article mounting assembly may be removed from the crevice.

Referring next to FIGS. 22-29 of the drawings, a still further non-limiting alternative illustrative embodiment of the universally positional article mounting assemblies is generally indicated by reference numeral 801. In the assembly 801, elements which are analogous to the respective elements of the assembly 1 that was heretofore described with respect to FIGS. 1-5 are designated by the same numerals in the 801-899 series in FIGS. 22-29. Unless otherwise noted, the elements and features of the assembly 801 may encompass the same descriptions which were heretofore applied to any of the embodiments of the assemblies in FIGS. 1-21.

In some embodiments, the mounting tab 802 of the assembly 801 may be generally elongated and flat or planar with a tab panel 803 having a first panel surface 804, a second panel surface 805, a tab insert end 806, an article mount edge 807 and a pair of tab side edges 808 (FIG. 23) extending between the tab insert end 806 and the article mount edge 807. The tab side edges 808 may be generally parallel to each other. Alternatively, the tab side edges 808 may gradually taper toward each other from the article mount edge 807 to the tab insert end 806. Thus, the tab insert end 806 may be rounded in some embodiments, as illustrated, or pointed or truncated in other embodiments.

In some embodiments, a tab head 814 may protrude from at least one of the first panel surface 804 and the second panel surface 805 at the end of the tab panel 803 which is opposite the tab insert end 806. In some embodiments, the tab head 814 may be molded and/or otherwise fabricated integrally with the tab panel 803 of the mounting tab 802 according to the knowledge of those skilled in the art. Accordingly, the article mount edge 807 of the tab panel 803 may be embedded in the tab head 814. In other embodiments, the tab head 814 may be fabricated separately and applied to the tab panel 803 according to the knowledge of those skilled in the art. As illustrated in FIG. 22, in some embodiments, the tab head 814 may be generally wedge-shaped in side view or cross-section with a stem mount surface 816 which may be generally flat or planar. At least one beveled vehicle interior engaging surface 815 may slope or angle from the stem mount surface 816 and terminate at the first panel surface 804 and/or the second panel surface 805 of the tab panel 803. In some embodiments, a pair of beveled, sloped or angled vehicle interior engaging surfaces 815 may extend from the stem mount surface 816 and terminate at the respective first panel surface 804 and second panel surface 805 of the tab panel 803, as illustrated. In some embodiments, at least one tab ridge 810 may protrude from at least one of the first panel surface 804 and the second panel surface 805 between the respective vehicle interior engaging surface or surfaces 815 of the tab head 814 and the tab insert end 806 of the tab panel 803 in a selected number and pattern. The vehicle interior engaging surface or surfaces 815 on the tab head 814 may gradually increase the width of the mounting tab 802 to facilitate secure insertion of the mounting tab 802 into crevices having a wide variety of widths and increase the number of possible locations or positions which a user can select to mount the assembly 801 within the vehicle interior 60 (FIGS. 30-32), as will be hereinafter described. In alternative embodiments, the mounting tab 802 may be substantially uniform in thickness along its length.

The multi-positional and universally manipulatable article stem 820 of the assembly 801 extends from the mounting tab 802 and can be selectively bended, rotated, twisted and/or otherwise manually universally spatially manipulated into a desired two-dimensional or three-dimensional position or configuration to support or hold at least one article 826 on the vehicle interior 60 in a desired orientation for display and/or retrieval and use by one or more occupants of the vehicle. The article stem 820 may have a proximal stem end 821 which is attached to or embedded in the stem mount surface 816 of the tab head 814 according to the knowledge of those skilled in the art and a distal stem end 822 which is opposite the proximal stem end 821.

As illustrated in FIG. 22, the at least one article 826 of the assembly 801 is provided on the distal stem end 822 of the article stem 820. The article 826 may include an article panel 827 having a display surface 828 and a stem attachment surface 829. In some embodiments, indicia 830 (FIG. 24) may be stamped, molded, casted, printed, engraved or otherwise provided on the display surface 828. The article 826 may include any object or medium which is to be displayed for viewing and/or access and retrieval for use by an occupant of a vehicle 60 (FIG. 30). Non-limiting examples of the article 826 include physical embodiments of a two-dimensional or three-dimensional design, shape, symbol or image; advertising insignia; sports team images, logos and/or names; slogans, sayings or quotes; note pads; pencils, pens and other writing implements; skin moisturizing formulations; and support structures or holders which support or hold one or more secondary articles for display and/or use. In some embodiments, the article 826 may be adapted to hold at least one secondary article such as a note pad 240 (FIGS. 8 and 9), such as a POST-IT® note pad or a writing implement 356 (FIGS. 10 and 11), for example and without limitation, at a selected optimum location or position in the vehicle interior 60 for retrieval and use by an occupant in the vehicle.

The article panel 827 article 826 may be attached or secured to the distal stem end 822 of the article stem 820 according to the knowledge of those skilled in the art. In some embodiments, a mounting pad 834 may be provided on the stem attachment surface 829 of the article panel 827. The distal stem end 822 of the article stem 820 may be embedded in or attached to the mounting pad 834. In other embodiments, the mounting pad 834 may be omitted and the distal stem end 822 of the article stem 820 may be embedded in or directly attached to the stem attachment surface 829 of the article panel 827 according to the knowledge of those skilled in the art.

As further illustrated in FIG. 22, the article panel 827 of the article 826 may be disposed within an article plane 831. The article stem 820 has an elongated article stem axis 832 which is normally disposed in generally perpendicular relationship to the article plane 831 of the article panel 827 of the article 826.

Referring next to FIGS. 24-32 of the drawings, typical application of the assembly 801 may be as was heretofore described with respect to the assembly 1 in FIGS. 12-13. Accordingly, the article 826 can be mounted in a selected location or position in the vehicle interior 60 to render the article 826 easily visible to and/or accessible and retrievable for use by an occupant of the vehicle, such as in a first crevice 61 which extends between a main dashboard portion 62 and an airbag cover 63; a second crevice 66 which extends between the main dashboard portion 62 and a vehicle glove compartment door 67; a third crevice 70 which extends between the main dashboard portion 62 and a vehicle center console 71; or a fourth crevice 73 which extends between the main dashboard portion 62 and a dashboard panel 74, as illustrated. In various other applications of the assembly 801, the mounting tab 802 may be inserted into crevices (not illustrated) in other locations, positions, areas, compartments or components within the vehicle interior 60, including but not limited to the vehicle ceiling and interior of a vehicle door (not illustrated)

Figure 32:
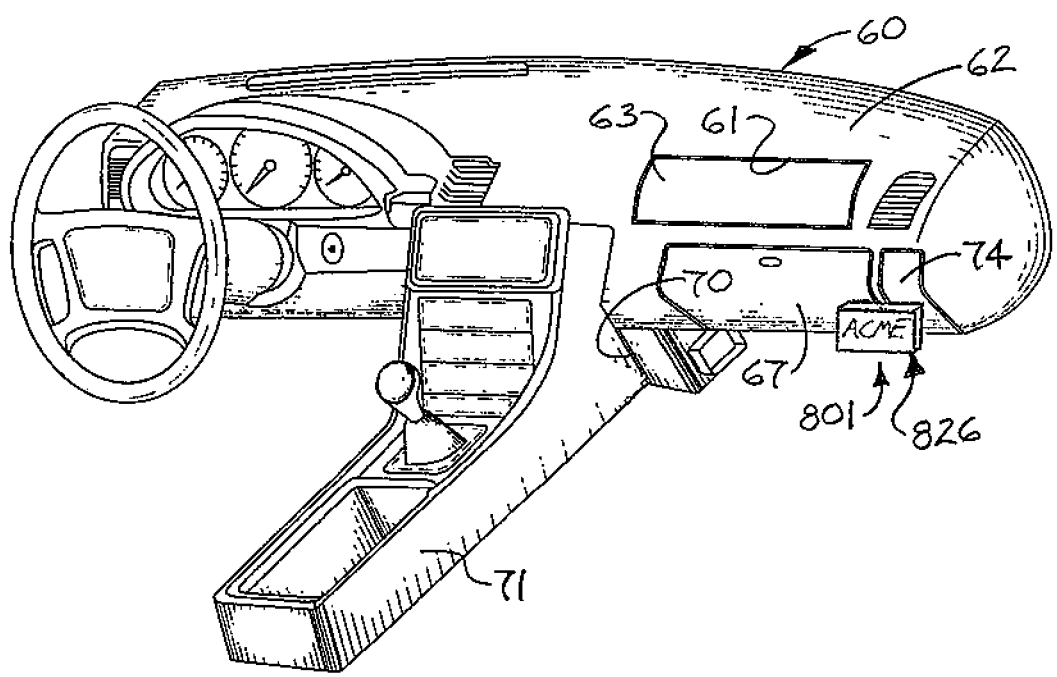
FIG. 32 is a front perspective view of the vehicle interior, with the universally positional article mounting assembly deployed in place for viewing and/or access, retrieval and use of the article by one or more occupants of the vehicle.

The article plane 831 (FIG. 22) of the article panel 827 of the article 826 is normally disposed in generally perpendicular relationship to the article stem axis 832 of the article stem 820. Thus, as illustrated in FIG. 32, in the mounted configuration of the assembly 801, the article 826 normally covers or conceals the article stem 820 and the mounting tab 802 (FIG. 30). The article stem 820 may be bended, twisted and/or otherwise physically manipulated to spatially orient the article 826 in such a manner that the article 826 will be visible to occupants in any location within the vehicle when the mounting tab 802 of the assembly 801 is inserted in the crevice 73. Accordingly, the mounting tab 802 may be inserted in the crevice 73 before or after the article stem 820 is suitably manipulated. In some embodiments, the tab ridges 810 (FIGS. 22 and 23) on the tab panel 803 of the mounting tab 802 may frictionally engage one of the interior surfaces of the crevice 73 to stabilize the mounting tab 802 within the crevice 73. In some applications, depending upon the width of the crevice 73, the mounting tab 802 may be inserted in the crevice 73 to an extent that the beveled vehicle interior engaging surface or surfaces 815 on the tab head 814 engage(s) the interior surface of the crevice 73 to secure or wedge the mounting tab 802 within the crevice 73.

As illustrated in FIGS. 24-29, the article stem 820 may be selectively manipulated in a variety of ways to orient the article 826 such that the insignia 830 (FIG. 24) on the article panel 827 of the article 826 is easily visible to one or more occupants (not illustrated) of the vehicle interior 60. Accordingly, as illustrated in FIGS. 24 and 25, in some applications, a proximal bend 823 and a distal bend 824 may be induced in the article stem 820 with the article 826 disposed generally above and in front of the mounting tab 802. As illustrated in FIGS. 26-29, in other applications, the article stem 820 may be manipulated to position the article 826 generally below and in front of the mounting tab 802. In still other applications, the article stem 820 may be manipulated to position the article 826 to the side or in any other position relative to the mounting tab 802 or may be twisted or rotated to position or orient the article 826 in any other desired orientation. It will be appreciated by those skilled in the art that the normally generally perpendicular orientation of the article plane 831 of the article panel 827 with respect to the article stem axis 832 of the article stem 820 aids in manipulation of the article stem 820 to the desired position and orientation of the article 826 within the vehicle interior 60 ease of viewing by one or more occupants within the vehicle interior 60. The article 801 can be easily removed or detached from the vehicle interior 60 by pulling the mounting tab 802 from the crevice 73.

Figure 33:
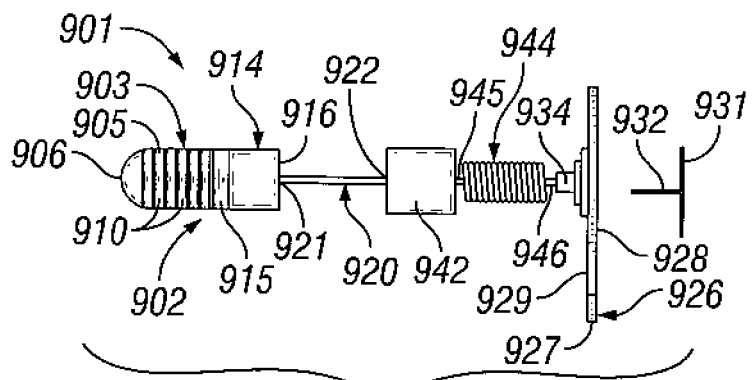
FIG. 33 is a side view of yet another alternative illustrative embodiment of the universally positional article mounting assemblies.
Figure 34:
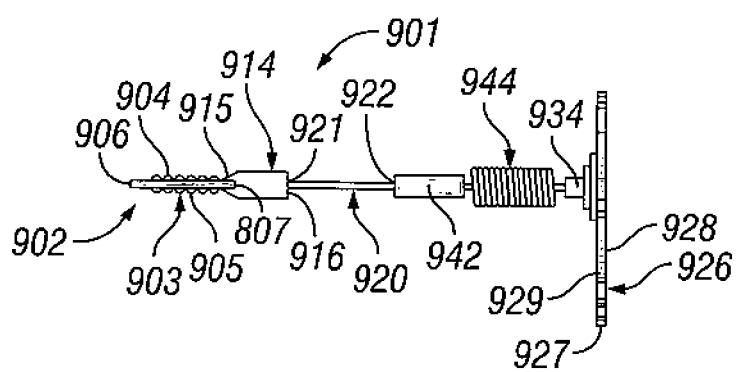
FIG. 34 is a top view of the universally positional article mounting assembly illustrated in FIG. 33.
Figure 35:
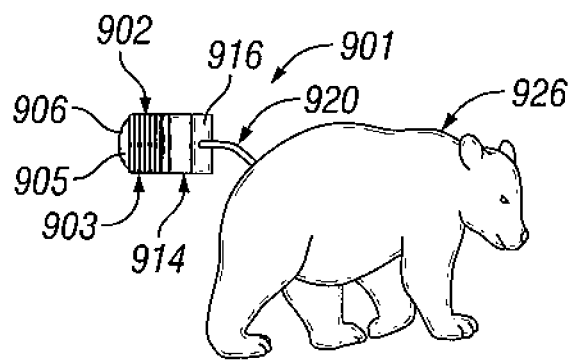
FIG. 35 is a front view of the universally positional article mounting assembly illustrated in FIG. 33 with the article stem configured such that the article is disposed to the side of the mounting tab.

Referring next to FIGS. 33-35 of the drawings, yet another non-limiting alternative illustrative embodiment of the universally positional article mounting assemblies is generally indicated by reference numeral 901. In the assembly 901, elements which are analogous to the respective elements of the assembly 601 that was heretofore described with respect to FIGS. 16A and 16B are designated by the same numerals in the 901-999 series in FIGS. 33-35. Unless otherwise noted, the elements and features of the assembly 901 may encompass the same descriptions which were heretofore applied to any of the embodiments of the assemblies in FIGS. 1-32.

The universally manipulatable article stem 920 may extend from the stem mount surface 916 of the tab head 914 on the mounting tab 902 at the proximal stem end 921. A spring mount base 942 may be provided on the distal stem end 922 of the article stem 920. A flexible, coiled article spring 944 may have a proximal spring end 945 which is attached to the spring mount base 942. The article 926 may be attached to a distal spring end 946 of the article spring 944 according to the knowledge of those skilled in the art. In some embodiments, the distal spring end 946 of the article spring 944 may be attached to or embedded in a mounting pad 934 which is provided on the stem attachment surface 929 of the article panel 927. In other embodiments, the distal spring end 946 may be directly attached to or embedded in the stem attachment surface 929 of the article panel 927 according to the knowledge of those skilled in the art. Thus, the article stem 920, the spring mount base 942 and the article spring 944 may flexibly connect the article 926 to the mounting tab 902. As illustrated in FIG. 33, the article panel 927 of the article 926 is disposed in an article plane 931 which is generally perpendicular to an article stem axis 932 of the article stem 920.

In mounting of the assembly 901 on the vehicle interior 60 (FIG. 32), the article stem 920 facilitates universal positioning and orienting capability of the article 926 relative to the mounting tab 902. The flexible article spring 944 facilitates multidirectional movement of the article 926 relative to the stationary mounting tab 902 during movement of the vehicle to engage the attention of occupants in the vehicle.

Figure 36:
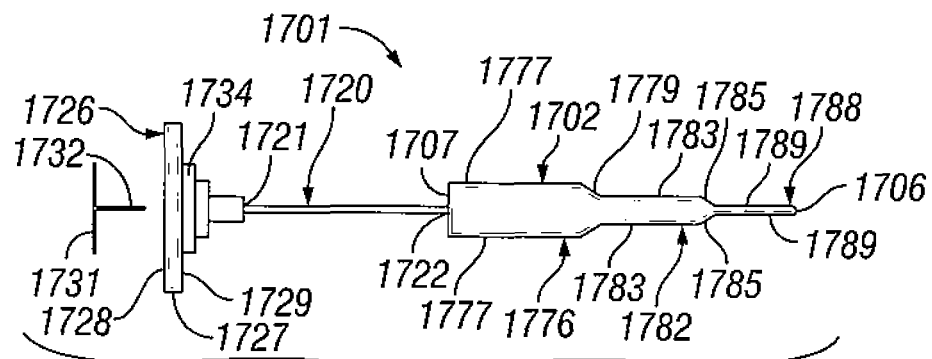
FIG. 36 is a top view of still another illustrative embodiment of the universally positional article mounting assemblies.
Figure 37:
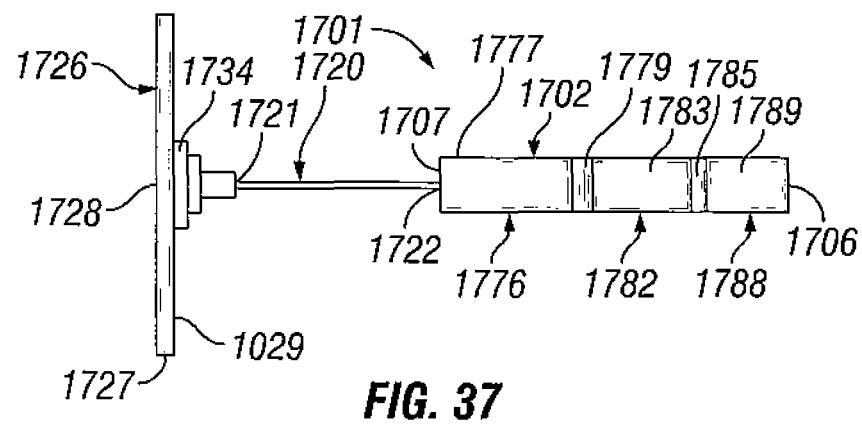
FIG. 37 is a top view of the illustrative universally positional article mounting assembly illustrated in FIG. 36.

Referring next to FIGS. 36 and 37 of the drawings, still another illustrative embodiment of the universally positional article mounting assemblies is generally indicated by reference numeral 1701. In the assembly 1701, elements which are analogous to the respective elements of the assembly 701 that was heretofore described with respect to FIGS. 17-20 are designated by the same numerals in the 1701-1799 series in FIGS. 36 and 37. Unless otherwise noted, the elements and features of the assembly 1701 may encompass the same descriptions which were heretofore applied to any of the embodiments of the assemblies in FIGS. 1-37. As illustrated in FIG. 36, the article panel 1727 of the article 1726 is disposed in an article plane 1731 which is generally perpendicular to an article stem axis 1732 of the article stem 1720.

The mounting tab 1702 of the assembly 1701 may include a tab base 1776 provided on the distal stem end 1722 of the article stem 1720, a tab middle segment 1782 extending from the tab base 1776 and a tab insertion segment 1788 extending from the tab middle segment 1782. The tab base 1776, the tab middle segment 1782 and the tab insertion segment 1788 may have thicknesses which correspond to the tab base thickness 778, the middle segment thickness 784 and the insertion segment thickness 790, respectively, of the mounting tab 702 of the assembly 701 which was heretofore described with respect to FIG. 17.

The tab base 1776 of the mounting tab 1702 may include a pair of opposite, generally planar tab base crevice engaging surfaces 1777. The tab middle segment 1782 of the mounting tab 1702 may have a pair of opposite, generally planar middle segment crevice engaging surfaces 1783. At least one, and typically, a pair of beveled tab base transition surfaces 1779 may angle from the tab base crevice engaging surfaces 1777 of the tab base 1776 to one or both of the respective crevice engaging surfaces 1783 of the tab middle segment 1782.

The tab insertion segment 1788 of the mounting tab 1702 may include a pair of opposite, planar insertion segment crevice engaging surfaces 1789. At least one, and typically, a pair of beveled middle segment transition surfaces 1785 may angle from the middle segment crevice engaging surfaces 1783 of the tab middle segment 1782 to one or both of the respective insertion segment crevice engaging surfaces 1789 of the tab insertion segment 1788. The tab insertion segment 1788 may have a tab insert end 1706 which may be generally rounded cross-section, as illustrated in FIG. 36. Application of the article mounting assembly 1701 may be as was heretofore described with respect to application of the article mounting assembly 701 in FIGS. 18-20.

Referring next to FIGS. 38-49 of the drawings, yet another illustrative embodiment of the article mounting assemblies is generally indicated by reference numeral 1001. In the assembly 1001, elements which are analogous to the respective elements of the assembly 1 that was heretofore described with respect to FIGS. 1-5 are designated by the same numerals in the 1001-1099 series in FIGS. 38-49. Unless otherwise noted, the elements and features of the assembly 1001 may encompass the same descriptions which were heretofore applied to any of the embodiments of the assemblies in FIGS. 1-37.

A tab socket 1014 is provided on the tab panel 1003 of the mounting tab 1002. The article 1026 is provided on an article mounting socket 1034. In a manner which will be hereinafter described, the article stem 1020 connects the article mounting socket 1034 to the tab socket 1014 in such a manner that the article mounting socket 1034 and the article 1026 thereon is capable of selective multi-directional positioning relative to the tab socket 1014 and the mounting tab 1002. A proximal stem ball 1023 may terminate the proximal stem end 1021 of the article stem 1020. A distal stem ball 1024 may terminate the distal stem end 1022 of the article stem 1020. Accordingly, the proximal stem ball 1023 may articulate in the tab socket 1014, whereas the distal stem ball 1024 may articulate in the article mounting socket 1034, to facilitate substantially universal selective multi-positional capability of the article 1026 relative to the article mounting tab 1002.

In some embodiments, the tab socket 1014 may be casted, molded and/or otherwise fabricated in one piece with the tab panel 1003 of the mounting tab 1002 according to the knowledge of those skilled in the art. In other embodiments, the mounting tab 1002 and the tab socket 1014 may be fabricated separately and the tab socket 1014 attached to the tab panel 1003 using glue, mechanical fasteners and/or other fastening techniques known by those skilled in the art. As illustrated in FIGS. 38 and 39, the tab socket 1014 may have a tab socket base 1092 at the article mount edge 1007 of the tab panel 1003. Multiple tab socket fingers 1093 may protrude from the tab socket base 1092 in spaced-apart relationship to each other. In some embodiments, each tab socket finger 1093 may be generally curved along its length.

As illustrated in FIG. 39, a tab socket interior 1094 may be formed by and between the tab socket base 1092 and the tab socket fingers 1093 of the tab socket 1014. A concave interior socket surface 1095 which communicates with the tab socket interior 1094 may extend into the tab socket base 1092. Concave interior tab socket finger surfaces 1096 may be provided in the respective tab socket fingers 1093. Each interior tab socket finger surface 1096 may be continuous with the interior socket surface 1095 and may face and communicate with the tab socket interior 1094. A tab socket finger notch 1097 may separate adjacent ones of the tab socket fingers 1093 from each other. The tab socket finger notches 1097 may communicate with the tab socket interior 1094. In some embodiments, 4 tab socket fingers 1093 may extend from the tab socket base 1092 and 4 tab socket notches 1097 may be provided between the tab socket fingers 1093, as illustrated. In other embodiments, the number of tab socket fingers 1093 and tab socket notches 1097 may vary.

As illustrated in FIGS. 38 and 40, the article mounting socket 1034 of the assembly 1001 may have a mounting socket base 1035. Multiple mounting socket fingers 1036 may protrude from the mounting socket base 1035 in spaced-apart relationship to each other. In some embodiments, each mounting socket finger 1036 may be generally curved along its length.

As illustrated in FIG. 40, a mounting socket interior 1037 may be formed by and between the mounting socket base 1035 and the mounting socket fingers 1036. A concave interior mounting socket surface 1038 which communicates with the mounting socket interior 1037 may extend into the mounting socket base 1035. Concave interior mounting socket finger surfaces 1039 may be provided in the respective mounting socket fingers 1036. Each interior mounting socket finger surface 1039 may be continuous with the interior mounting socket surface 1038 and faces and communicates with the mounting socket interior 1037. A mounting socket finger notch 1040 may separate adjacent ones of the mounting socket fingers 1036 from each other. The mounting socket finger notches 1040 may communicate with the mounting socket interior 1037. In some embodiments, 4 mounting socket fingers 1036 may extend from the mounting socket base 1035 and 4 mounting socket finger notches 1040 may be provided between the mounting socket fingers 1036, as illustrated. In other embodiments, the number of mounting socket fingers 1036 and mounting socket finger notches 1040 may vary.

As illustrated in FIGS. 42 and 48, the proximal stem ball 1023 on the article stem 1020 may snap into the companion tab socket interior 1094 (FIG. 39) in the tab socket 1014 in a friction or interference fit. In like manner, the distal stem ball 1024 on the article stem 1020 may snap into the companion mounting socket interior 1037 (FIG. 40) in the article mounting socket 1034. Accordingly, as illustrated in FIGS. 41-47, the articulation of the proximal stem ball 1023 of the article stem 1020 in the tab socket 1014 and the articulation of the distal stem ball 1024 of the article stem 1020 in the article mounting socket 1034 facilitates selective multi-directional positioning capability of the article 1026 on the article mounting socket 1034 with respect to the article mounting tab 1002. As illustrated in FIG. 43, in some applications, the article stem 1020 may be selectively deployed in an axial or aligned orientation with the article mounting tab 1002 to deploy the article 1026 in front of the article mounting tab 1002. As illustrated in FIG. 44, the article stem 1020 may be oriented in an angled position such that the article mounting tab 1002 is deployed to the right of the article mounting tab 1002. Alternatively, as illustrated in FIG. 46, the article stem 1020 may be oriented such that the article mounting tab 1002 is deployed to the left of the article mounting tab 1002. In other applications, the article stem 1020 may be oriented such that the article mounting tab 1002 is deployed above (FIG. 45) or below (FIG. 47) the article mounting tab 1002. In the angled position, the article stem 1020 may be inserted into one of the tab socket finger notches 1097 (FIG. 39) between the tab socket fingers 1093 of the tab socket 1014 and/or the mounting socket finger notches 1040 (FIG. 40) between the mounting socket fingers 1036 of the article mounting socket 34. The sizes of the proximal stem ball 1023 and the distal stem ball 1024 relative to the tab socket interior 1094 and the mounting socket interior 1037, respectively, may be selected such that the proximal stem ball 1023 remains in a selected orientation in the tab socket interior 1094 and the distal stem ball 1024 remains in a selected orientation in the mounting socket interior 1037 responsive to manual positioning of the article stem 1020 in the desired orientation.

As illustrated in FIG. 49, typical application of the assembly 1001 may be as was heretofore described with respect to the assembly 1 in FIGS. 12, 12A and 13. Accordingly, the mounting tab 1002 may be inserted in a crevice 1073 in a dashboard 1074 or other portion of a vehicle interior 1060. The article 1026 may be selectively positioned in front, above, below, to the right or to the left of the mounting tab 1002, as heretofore described in FIGS. 41-47, according to the preferences of the user.

Referring next to FIG. 50, yet another alternative illustrative embodiment of the article mounting assemblies is generally indicated by reference numeral 1101. In the assembly 1101, elements which are analogous to the respective elements of the assembly 901 that was heretofore described with respect to FIGS. 33-35 and the assembly 1001 that was heretofore described with respect to FIGS. 38-49 are designated by the same numerals in the 1101-1199 series in FIG. 50. Unless otherwise noted, the elements and features of the assembly 1101 may encompass the same descriptions which were heretofore applied to any of the embodiments of the assemblies in FIGS. 1-49.

The spring mount base 1142 of the assembly 1101 may have a design which is the same as or similar to the article mounting socket 1034 that was heretofore described with respect to the assembly 1001 in FIGS. 38 and 40. Accordingly, the spring mount base 1142 may include the same features and descriptions which were heretofore applied to the article mounting socket 1034 of the assembly 1001, with a spring mount base socket interior 1037 which receives the distal stem ball 1124 of the article stem 1120. The article spring 1144 may extend from the spring mount base 1142 at the proximal spring end 1145 of the article spring 1144. The article 1126 may be attached to the distal spring end 1146 of the article spring 1144.

Application of the assembly 1101 may be as was heretofore described with respect to the assembly 901 in FIGS. 33-35 and the assembly 1001 in FIGS. 38-49. Thus, the article 1126 may be positioned at a selected orientation relative to the mounting tab 1102 by articulation of the proximal stem ball 1123 in the tab socket 1114 and articulation of the distal stem ball 1124 in the spring mount base 1142. The flexible article spring 1144 facilitates multidirectional movement of the article 1126 relative to the stationary mounting tab 1102 during movement of the vehicle to engage the attention of occupants in the vehicle.

Referring next to FIG. 51 of the drawings, still another alternative illustrative embodiment of the article mounting assemblies is generally indicated by reference numeral 1201. In the assembly 1201, elements which are analogous to the respective elements of the assembly 701 that was heretofore described with respect to FIGS. 17-20 and the assembly 1001 that was heretofore described with respect to FIGS. 38-49 are designated by the same numerals in the 1201-1299 series in FIG. 51. Unless otherwise noted, the elements and features of the assembly 1201 may encompass the same descriptions which were heretofore applied to any of the embodiments of the assemblies in FIGS. 1-50.

Application of the assembly 1201 may be as was heretofore described with respect to the assembly 701 in FIGS. 17-20 and the assembly 1001 in FIGS. 38-49. Thus, the article 1226 may be positioned at a selected orientation relative to the mounting tab 1202 by articulation of the proximal stem ball 1223 in the tab socket 1214 and articulation of the distal stem ball 1224 in the article mounting socket 1234. The variable thickness of the mounting tab 1202 facilitates insertion of the mounting tab 1202 in crevices having various thicknesses in the vehicle interior.

Referring next to FIG. 52 of the drawings, a still further alternative illustrative embodiment of the article mounting assemblies is generally indicated by reference numeral 1301. In the assembly 1301, elements which are analogous to the respective elements of the assembly 701 that was heretofore described with respect to FIGS. 17-20 and the assembly 1001 that was heretofore described with respect to FIGS. 38-49 are designated by the same numerals in the 1301-1399 series in FIG. 52. Unless otherwise noted, the elements and features of the assembly 1301 may encompass the same descriptions which were heretofore applied to any of the embodiments of the assemblies in FIGS. 1-51.

Application of the assembly 1301 may be as was heretofore described with respect to the assembly 1101 in FIG. 50 and the assembly 1201 in FIG. 51. Thus, the article 1326 may be positioned at a selected orientation relative to the mounting tab 1302 by articulation of the proximal stem ball 1323 in the tab socket 1314 and articulation of the distal stem ball 1324 in the spring mount base 1342. The flexible article spring 1344 facilitates multidirectional movement of the article 1326 relative to the stationary mounting tab 1302 during movement of the vehicle to engage the attention of occupants in the vehicle. Moreover, the variable thickness of the mounting tab 1302 facilitates insertion of the mounting tab 1302 in crevices having various thicknesses in the vehicle interior.

While the embodiments of the disclosure have been described above, it will be recognized and understood that various modifications can be made and the appended claims are intended to cover all such modifications which may fall within the spirit and scope of the disclosure.

What is claimed is:

1. A universally positional article mounting assembly for mounting an article in a vehicle interior, comprising:
a substantially rigid, incompressible article mounting tab including a tab socket, the tab socket having a tab socket interior, the article mounting tab having a thickness of no greater than about 2.75 mm and configured for insertion into a crevice having a thickness of no greater than about 2.75 mm;
an article stem carried by the tab socket interior in articulating relationship to the tab socket;

an article mounting socket carried by the article stem in articulating relationship to the article stem, the article mounting socket having a mounting socket interior receiving the article stem;

at least one article carried by the article mounting socket, the article stem can be selectively deployed in an aligned or angled orientation with the article mounting tab to facilitate substantially universal selective multi-positional capability of the at least one article relative to the article mounting tab and support or hold the at least one article in a desired orientation;

wherein the mounting tab comprises a tab base having a tab base thickness; a tab middle segment extending from the tab base, the tab middle segment having a middle segment thickness less than the tab base thickness of the tab base; and a tab insertion segment extending from the tab middle segment, the tab insertion segment having an insertion segment thickness less than the middle segment thickness of the tab middle segment; and wherein the tab base comprises a pair of generally planar, spaced-apart tab base crevice engaging surfaces; the tab middle segment comprises a pair of generally planar, spaced-apart middle segment crevice engaging surfaces; and the tab insertion segment comprises a pair of generally planar, spaced-apart insertion segment crevice engaging surfaces; and further comprising a pair of beveled tab base transition surfaces extending from the tab base crevice engaging surfaces of the tab base to the middle segment crevice engaging surfaces, respectively, of the tab middle segment and a pair of beveled middle segment transition surfaces extending from the middle segment crevice engaging surfaces of the tab middle segment to the insertion segment crevice engaging surfaces, respectively, of the tab insertion segment.

\* \* \* \* \*